(12) United States Patent
Cao et al.

(10) Patent No.: US 11,847,763 B2
(45) Date of Patent: Dec. 19, 2023

(54) SYSTEMS AND METHODS FOR IMAGE RECONSTRUCTION

(71) Applicant: SHANGHAI UNITED IMAGING HEALTHCARE CO., LTD., Shanghai (CN)

(72) Inventors: Wenjing Cao, Shanghai (CN); Haohua Sun, Shanghai (CN); Liyi Zhao, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 340 days.

(21) Appl. No.: 17/124,524

(22) Filed: Dec. 17, 2020

(65) Prior Publication Data
US 2021/0104023 A1   Apr. 8, 2021

Related U.S. Application Data
(63) Continuation of application No. PCT/CN2020/090861, filed on May 18, 2020.

(51) Int. Cl.
*G06T 5/00* (2006.01)
*G06T 11/00* (2006.01)

(52) U.S. Cl.
CPC ............ *G06T 5/002* (2013.01); *G06T 11/005* (2013.01); *G06T 11/006* (2013.01);
(Continued)

(58) Field of Classification Search
CPC . G06T 5/002; G06T 11/005; G06T 2211/424; G06T 11/006; G06T 11/008;
(Continued)

(56) References Cited

U.S. PATENT DOCUMENTS 6,507,633 B1    1/2003   Elbakri et al.
9,478,048 B2 *  10/2016  Royalty ................. G06T 19/00
(Continued)

FOREIGN PATENT DOCUMENTS

CN   104166971 B   7/2015
CN   106683144 A   5/2017
(Continued)

OTHER PUBLICATIONS

T. Y. Niu, X. Dong, M. Petrongolo, L. Zhu, "Iterative image-domain decomposition for dual-energy CT," Med Phys 41, Apr. 2014. (Year: 2014).*

(Continued)

*Primary Examiner* — Jose L Couso
(74) *Attorney, Agent, or Firm* — METIS IP LLC

(57) ABSTRACT

The present disclosure relates to systems and methods for image reconstruction. The system may obtain an initial image to be processed. The system may generate a reconstructed image by performing a plurality of iteration steps on the initial image. Each of the plurality of iteration steps may include a first optimization operation and at least one second optimization operation. The first optimization operation and the at least one second optimization operation may be executed sequentially. The first optimization operation may include receiving an image to be processed in the iteration step and determining an updated image by preliminarily optimizing the image to be processed. The at least one second optimization operation may include determining an optimized image by reducing interference information of the updated image and designating the optimized image as a next image to be processed in a next iteration step. The interference information may include noise information and/or artifact information.

20 Claims, 10 Drawing Sheets

(52) U.S. Cl.
CPC ....... *G06T 11/008* (2013.01); *G06T 2211/424* (2013.01); *G06T 2211/436* (2013.01)

(58) Field of Classification Search
CPC ......... G06T 7/0012; G06T 2207/10081; G06T 11/03; G06T 2207/10104; G06T 17/00; G06T 15/08; G06T 2211/416; G06T 7/002; G06T 2207/10108; G06T 2207/10116; G06T 3/4046; G06T 9/002; G06T 2207/20081; G06T 2207/20084; A61B 6/03; A61B 6/037; A61B 6/5258; A61B 6/027; A61B 6/032; A61B 6/481; A61B 6/501; A61B 6/5205; G01N 23/046; G06F 18/2115; G06F 18/214; G06F 18/22; G06V 10/30; G06V 10/454; G06V 10/764; G06V 10/82; G06V 2201/03; G06V 10/54; G06V 30/18057; G06N 3/02; G06N 3/08–088; G06N 3/0445; G06N 3/0454; G06N 7/00; G06N 20/00; G06K 7/1482; Y10S 128/925
See application file for complete search history.

(56) References Cited

U.S. PATENT DOCUMENTS

| | | | | |
|---|---|---|---|---|
| 10,679,385 | B1* | 6/2020 | Yanoff | G01T 1/1663 |
| 11,328,391 | B2* | 5/2022 | Li | G06T 5/50 |
| 2011/0262054 | A1* | 10/2011 | Benson | G01N 23/046 382/275 |
| 2011/0293158 | A1* | 12/2011 | Popescu | G06T 11/006 382/266 |
| 2012/0207370 | A1* | 8/2012 | Fahimian | G06T 11/005 378/19 |
| 2012/0263360 | A1* | 10/2012 | Zhu | G06T 11/005 382/131 |
| 2013/0002659 | A1* | 1/2013 | Jiang | G06T 11/006 345/419 |
| 2013/0101190 | A1 | 4/2013 | Shi et al. | |
| 2013/0336561 | A1* | 12/2013 | Zamyatin | G06T 11/006 382/131 |
| 2013/0336562 | A1* | 12/2013 | Zamyatin | G06T 11/006 382/131 |
| 2014/0363067 | A1* | 12/2014 | Stayman | G06T 11/005 382/131 |
| 2015/0170341 | A1* | 6/2015 | Fan | A61B 6/482 378/4 |
| 2015/0221124 | A1 | 8/2015 | Noo et al. | |
| 2016/0071245 | A1* | 3/2016 | Bergner | G06T 5/002 382/131 |
| 2017/0039706 | A1 | 2/2017 | Mikhno et al. | |
| 2017/0294034 | A1 | 10/2017 | Zhou et al. | |
| 2017/0311918 | A1* | 11/2017 | Qi | A61B 6/5235 |
| 2018/0038969 | A1* | 2/2018 | McCollough | A61B 6/032 |
| 2018/0182133 | A1* | 6/2018 | Tanaka | G06T 7/0012 |
| 2018/0197317 | A1 | 7/2018 | Cheng et al. | |
| 2018/0204305 | A1 | 7/2018 | Wang et al. | |
| 2018/0247434 | A1* | 8/2018 | Qin | G06T 11/005 |
| 2018/0336709 | A1* | 11/2018 | Persson | G06T 11/006 |
| 2019/0236763 | A1* | 8/2019 | Chan | A61B 6/032 |
| 2019/0251713 | A1* | 8/2019 | Chen | A61B 6/482 |
| 2019/0365341 | A1 | 12/2019 | Chan et al. | |
| 2020/0027251 | A1* | 1/2020 | Demesmaeker | G06N 3/08 |
| 2020/0043204 | A1 | 2/2020 | Fu et al. | |
| 2020/0242783 | A1* | 7/2020 | Lauritsch | G06T 7/246 |
| 2020/0311878 | A1* | 10/2020 | Matsuura | G06T 11/008 |
| 2021/0035339 | A1* | 2/2021 | Ahn | G06N 3/084 |
| 2021/0290194 | A1* | 9/2021 | Bai | A61B 6/466 |
| 2021/0319600 | A1* | 10/2021 | Tao | A61B 6/5211 |
| 2023/0063828 | A1* | 3/2023 | Bao | G16H 40/60 |
| 2023/0085203 | A1* | 3/2023 | Cao | G06T 11/006 382/131 |
| 2023/0154066 | A1* | 5/2023 | Cao | G06T 11/006 382/131 |
| 2023/0177746 | A1* | 6/2023 | Shao | G16H 50/20 382/131 |

FOREIGN PATENT DOCUMENTS

| | | |
|---|---|---|
| CN | 109461192 A | 3/2019 |
| CN | 109712213 A | 5/2019 |
| CN | 110853742 A | 2/2020 |
| WO | 2018210648 A1 | 11/2018 |
| WO | 2019060843 A1 | 3/2019 |
| WO | 2021232195 A1 | 11/2021 |

OTHER PUBLICATIONS

X. Dong, T. Y. Niu, L. Zhua, "Combined iterative reconstruction and image-domain decomposition for dual energy CT using total-variation regularization," Med Phys 41, May 2014. (Year: 2014).*
D. P. Clark, C. T. Badea, "Spectral diffusion: an algorithm for robust material decomposition of spectral CT data," Phys Med Biol 59, 6445-6466, Oct. 2014. (Year: 2014).*
International Search Report in PCT/CN2020/090861 dated Feb. 20, 2021, 5 pages.
Written Opinion in PCT/CN2020/090861 dated Feb. 20, 2021, 4 pages.
The Extended European Search Report in European Application No. 20936827.3 dated May 9, 2023, 8 pages.
Cheng, Lishui et al., Accelerated Iterative Image Reconstruction Using a Deep Learning Based Leapfrogging Strategy, The 14th International Meeting on Fully Three-Dimensional Image Reconstruction in Radiology and Nuclear Medicine, 715-720, 2017.
The Extended European Search Report in European Application No. 21809428.2 dated Aug. 28, 2023, 8 pages.

* cited by examiner

SYSTEMS AND METHODS FOR IMAGE RECONSTRUCTION

CROSS-REFERENCE TO RELATED APPLICATIONS

This application is a continuation of International Application No. PCT/CN2020/090861 filed on May 18, 2020, which designates the United States of America, the contents of which are incorporated herein by reference in their entirety.

TECHNICAL FIELD

The present disclosure generally relates to image reconstruction, and more particularly, relates to systems and methods for iterative image reconstruction.

BACKGROUND

Medical imaging, such as computed tomography (CT) is widely used in disease diagnosis and/or treatment for various medical conditions (e.g., tumors, coronary heart diseases, or brain diseases). Image reconstruction is a key technology used in the field of medical imaging. Take CT image as an example, conventionally, a CT image can be reconstructed based on traditional filtered back projection (FBP) or FBP-based iteration. However, during the reconstruction of the CT image, a reduced dose or insufficient data may significantly effect a quality of the reconstructed CT image. In addition, the CT image can be iteratively reconstructed by optimizing a loss function including a regularization term such as a total variation, a Generalized Gaussian Markov Random Field (GGMRF). According to the iterative reconstruction process, although noises in the reconstructed CT image can be suppressed, the regularization term may result in relatively low image quality (e.g., massive artifacts, cartoon sense). Therefore, it is desirable to provide systems and methods for image reconstruction with improved image quality, thereby improving the efficiency and accuracy of medical analysis and/or diagnosis.

SUMMARY

An aspect of the present disclosure relates to a method for image reconstruction. The method may include obtaining an initial image to be processed and generating a reconstructed image by performing a plurality of iteration steps on the initial image. Each of the plurality of iteration steps may include a first optimization operation and at least one second optimization operation. The first optimization operation and the at least one second optimization operation may be executed sequentially. The first optimization operation may include receiving an image to be processed in the iteration step and determining an updated image by preliminarily optimizing the image to be processed. The at least one second optimization operation may include determining an optimized image by reducing interference information of the updated image and designating the optimized image as a next image to be processed in a next iteration step. The interference information may include noise information and/or artifact information.

In some embodiments, the determining the updated image by preliminarily optimizing the image to be processed may include determining forward projection data by performing a forward projection transformation on the image to be processed in the iteration step and determining the updated image based at least in part on back projection data of a weighted error between the forward projection data and originally acquired projection data associated with the initial image.

In some embodiments, the determining the updated image based at least in part on the back projection data of the weighted error between the forward projection data and the original acquired projection data may include determining a first quality weight associated with the originally acquired projection data; determining the weighted error between the forward projection data and originally acquired projection data based on the first quality weight, the forward projection data, and the originally acquired projection data; determining the back projection data of the weighted error by performing a backward projection transformation on the weighted error; and determining the updated image based on the back projection data of the weighted error.

In some embodiments, the first optimization operation may be performed according to Newton's algorithm or a gradient descent algorithm.

In some embodiments, the determining the optimized image by reducing the interference information of the updated image may include determining the optimized image by reducing interference information of the updated image based on an optimizing model. The optimizing model may include a machine learning model.

In some embodiments, the determining the optimized image by reducing the interference information of the updated image based on the optimizing model may include determining a quality feature of the updated image; inputting the updated image and the quality feature into the optimizing model; and determining the optimized image based on an output of the optimizing model.

In some embodiments, the quality feature may include a noise feature, an artifact feature, a gray distribution, a global gray scale, a resolution, and/or a contrast of the updated image.

In some embodiments, the noise feature may include a noise distribution, a noise intensity, and/or a noise rate. The artifact feature may include an artifact distribution, an artifact intensity, and/or an artifact rate.

In some embodiments, the optimizing model may be obtained by a training process. The training process may include obtaining a plurality of training samples and obtaining the optimizing model by training a preliminary optimizing model based on the plurality of training samples. Each of the plurality of training samples may include a sample image and a sample quality feature of the sample image. A loss function of the optimizing model may be positively related to a second quality weight. The second quality weight may be determined based on the sample quality feature.

A further aspect of the present disclosure relates to a system for image reconstruction. The system may include at least one storage device including a set of instructions and at least one processor configured to communicate with the at least one storage device. When executing the set of instructions, the at least one processor is configured to direct the system to perform operations. The operations may include obtaining an initial image to be processed and generating a reconstructed image by performing a plurality of iteration steps on the initial image. Each of the plurality of iteration steps may include a first optimization operation and at least one second optimization operation. The first optimization operation and the at least one second optimization operation may be executed sequentially. The first optimization operation may include receiving an image to be processed in the iteration step and determining an updated image by preliminarily optimizing the image to be processed. The at least one second optimization operation may include determining an optimized image by reducing interference information of the updated image and designating the optimized image as a next image to be processed in a next iteration step. The interference information may include noise information and/or artifact information.

In some embodiments, the determining the updated image by preliminarily optimizing the image to be processed may include determining forward projection data by performing a forward projection transformation on the image to be processed in the iteration step and determining the updated image based at least in part on back projection data of a weighted error between the forward projection data and originally acquired projection data associated with the initial image.

In some embodiments, the determining the updated image based at least in part on the back projection data of the weighted error between the forward projection data and the original acquired projection data may include determining a first quality weight associated with the originally acquired projection data; determining the weighted error between the forward projection data and originally acquired projection data based on the first quality weight, the forward projection data, and the originally acquired projection data; determining the back projection data of the weighted error by performing a backward projection transformation on the weighted error; and determining the updated image based on the back projection data of the weighted error.

In some embodiments, the first optimization operation may be performed according to Newton's algorithm or a gradient descent algorithm.

In some embodiments, the determining the optimized image by reducing the interference information of the updated image may include determining the optimized image by reducing interference information of the updated image based on an optimizing model. The optimizing model may include a machine learning model.

In some embodiments, the determining the optimized image by reducing the interference information of the updated image based on the optimizing model may include determining a quality feature of the updated image; inputting the updated image and the quality feature into the optimizing model; and determining the optimized image based on an output of the optimizing model.

In some embodiments, the quality feature may include a noise feature, an artifact feature, a gray distribution, a global gray scale, a resolution, and/or a contrast of the updated image.

In some embodiments, the noise feature may include a noise distribution, a noise intensity, and/or a noise rate. The artifact feature may include an artifact distribution, an artifact intensity, and/or an artifact rate.

In some embodiments, the optimizing model may be obtained by a training process. The training process may include obtaining a plurality of training samples and obtaining the optimizing model by training a preliminary optimizing model based on the plurality of training samples. Each of the plurality of training samples may include a sample image and a sample quality feature of the sample image. A loss function of the optimizing model may be positively related to a second quality weight. The second quality weight may be determined based on the sample quality feature.

A still further aspect of the present disclosure relates to a system for image reconstruction. The system may include an obtaining module and a reconstruction module. The obtaining module may be configured to obtain an initial image to be processed. The reconstruction module may be configured to generate a reconstructed image by performing a plurality of iteration steps on the initial image. Each of the plurality of iteration steps may include a first optimization operation and at least one second optimization operation. The first optimization operation and the at least one second optimization operation may be executed sequentially. In the first optimization operation, the reconstruction module may be further configured to receive an image to be processed in the iteration step and determine an updated image by preliminarily optimizing the image to be processed. In the at least one second optimization operation, the reconstruction module may be further configured to determine an optimized image by reducing interference information of the updated image and designate the optimized image as a next image to be processed in a next iteration step. The interference information may include noise information and/or artifact information.

In some embodiments, to determine the updated image by preliminarily optimizing the image to be processed, the reconstruction module may be further configured to determine forward projection data by performing a forward projection transformation on the image to be processed in the iteration step and determine the updated image based at least in part on back projection data of a weighted error between the forward projection data and originally acquired projection data associated with the initial image.

In some embodiments, to determine the updated image based at least in part on the back projection data of the weighted error between the forward projection data and the original acquired projection data, the reconstruction module may be further configured to determine a first quality weight associated with the originally acquired projection data; determine the weighted error between the forward projection data and originally acquired projection data based on the first quality weight, the forward projection data, and the originally acquired projection data; determine the back projection data of the weighted error by performing a backward projection transformation on the weighted error; and determine the updated image based on the back projection data of the weighted error.

In some embodiments, the first optimization operation may be performed according to a Newton's algorithm or a gradient descent algorithm.

In some embodiments, to determine the optimized image by reducing the interference information of the updated image, the reconstruction module may be further configured to determine the optimized image by reducing interference information of the updated image based on an optimizing model, the optimizing model including a machine learning model.

In some embodiments, to determine the optimized image by reducing the interference information of the updated image based on the optimizing model, the reconstruction module may be further configured to determine a quality feature of the updated image; input the updated image and the quality feature into the optimizing model; and determine the optimized image based on an output of the optimizing model.

In some embodiments, the quality feature may include a noise feature, an artifact feature, a gray distribution, a global gray scale, a resolution, and/or a contrast of the updated image.

In some embodiments, the noise feature may include a noise distribution, a noise intensity, and/or a noise rate. The artifact feature may include an artifact distribution, an artifact intensity, and/or an artifact rate.

In some embodiments, the system may further include a training module. The training module may be configured to obtain a plurality of training samples and obtain the optimizing model by training a preliminary optimizing model based on the plurality of training samples. Each of the plurality of training samples may include a sample image and a sample quality feature of the sample image. A loss function of the optimizing model may be positively related to a second quality weight. The second quality weight may be determined based on the sample quality feature.

A still further aspect of the present disclosure relates to a non-transitory computer readable medium including executable instructions. When the executable instructions are executed by at least one processor, the executable instructions may direct the at least one processor to perform a method. The method may include obtaining an initial image to be processed and generating a reconstructed image by performing a plurality of iteration steps on the initial image. Each of the plurality of iteration steps may include a first optimization operation and at least one second optimization operation. The first optimization operation and the at least one second optimization operation may be executed sequentially. The first optimization operation may include receiving an image to be processed in the iteration step and determining an updated image by preliminarily optimizing the image to be processed. The at least one second optimization operation may include determining an optimized image by reducing interference information of the updated image and designating the optimized image as a next image to be processed in a next iteration step. The interference information may include noise information and/or artifact information.

A still further aspect of the present disclosure relates to a method for image reconstruction. The method may include obtaining projection data to be processed and generating a reconstructed image by processing the projection data based on an image reconstruction model. The image reconstruction model may include a plurality of sequentially connected sub-models. Each of the plurality of sequentially connected sub-models include a processing layer and a reconstruction layer. The processing layer may be configured to receive an image to be processed in the sub-model and determine a regularization result by regularizing the image to be processed based on the projection data. The reconstruction layer may be configured to determine a sub-reconstructed image based on the regularization result and a previous sub-reconstructed image determined by a previously adjacent sub-model and designate the sub-reconstructed image as a next image to be processed in a next sub-model.

A still further aspect of the present disclosure relates to a system for image reconstruction. The system may include at least one storage device including a set of instructions and at least one processor configured to communicate with the at least one storage device. When executing the set of instructions, the at least one processor is configured to direct the system to perform operations. The operations may include obtaining projection data to be processed and generating a reconstructed image by processing the projection data based on an image reconstruction model. The image reconstruction model may include a plurality of sequentially connected sub-models. Each of the plurality of sequentially connected sub-models include a processing layer and a reconstruction layer. The processing layer may be configured to receive an image to be processed in the sub-model and determine a regularization result by regularizing the image to be processed based on the projection data. The reconstruction layer may be configured to determine a sub-reconstructed image based on the regularization result and a previous sub-reconstructed image determined by a previously adjacent sub-model and designate the sub-reconstructed image as a next image to be processed in a next sub-model.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
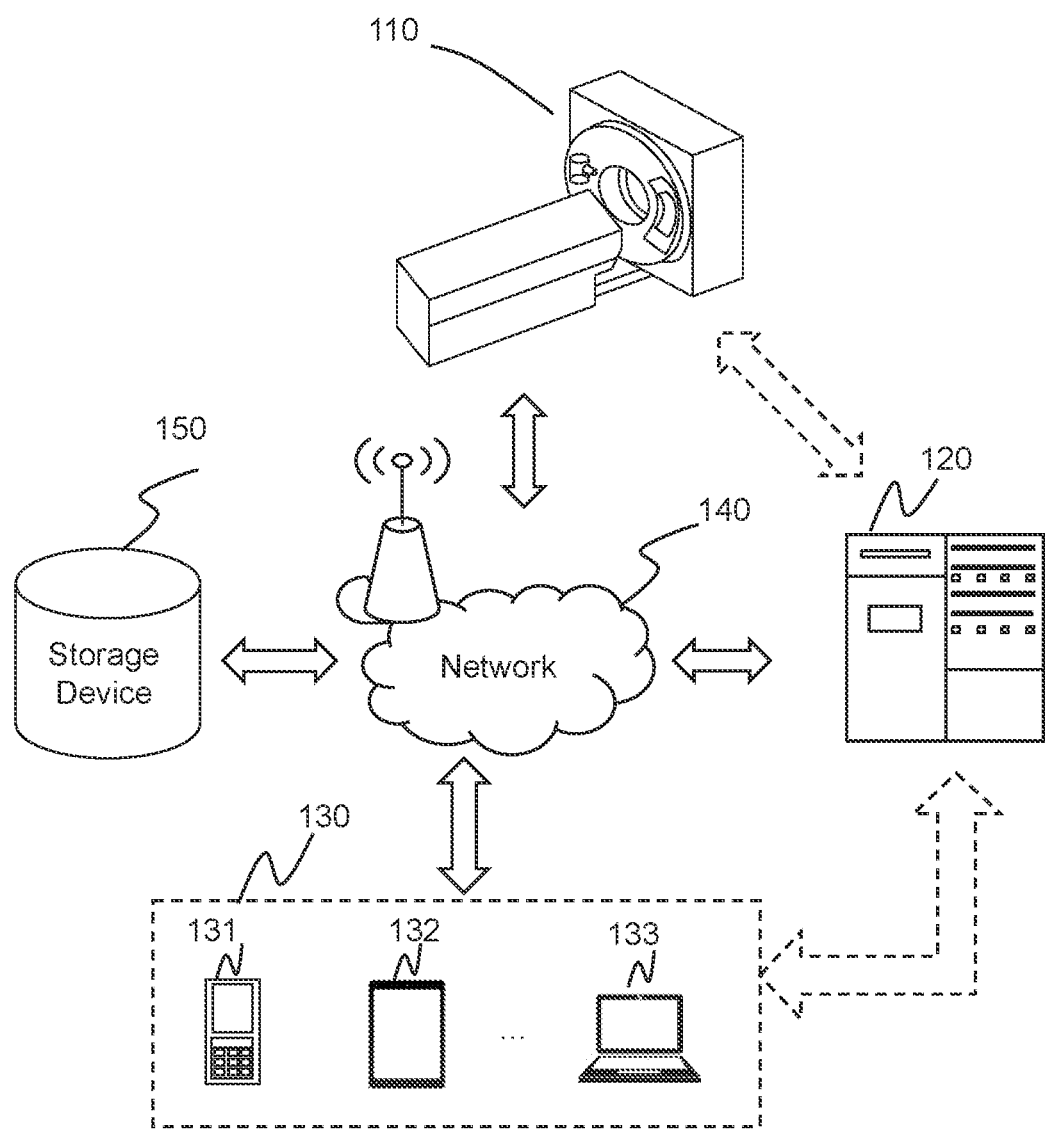
FIG. 1 is a schematic diagram illustrating an exemplary medical system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is to describe particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the terms "system," "unit," "module," and/or "block" used herein are one method to distinguish different components, elements, parts, sections, or assemblies of different levels in ascending order. However, the terms may be displaced by another expression if they achieve the same purpose.

Generally, the words "module," "unit," or "block," as used herein, refer to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 illustrated in FIG. 2 and/or the central processing unit (CPU) 340 illustrated FIG. 3) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may apply to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Provided herein are systems and methods for non-invasive biomedical imaging/treatment, such as for disease diagnostic, disease therapy, or research purposes. In some embodiments, the systems may include an imaging system. The imaging system may include a single modality system and/or a multi-modality system. The term "modality" used herein broadly refers to an imaging or treatment method or technology that gathers, generates, processes, and/or analyzes imaging information of a subject or treatments the subject. The single modality system may include, for example, an ultrasound imaging system, an X-ray imaging system, a computed tomography (CT) system, a magnetic resonance imaging (MRI) system, an ultrasonography system, a positron emission tomography (PET) system, an optical coherence tomography (OCT) imaging system, an ultrasound (US) imaging system, an intravascular ultrasound (IVUS) imaging system, a near-infrared spectroscopy (NIRS) imaging system, or the like, or any combination thereof. The multi-modality system may include, for example, an X-ray imaging-magnetic resonance imaging (X-ray-MRI) system, a positron emission tomography-X-ray imaging (PET-X-ray) system, a single photon emission computed tomography-magnetic resonance imaging (SPECT-MRI) system, a positron emission tomography-computed tomography (PET-CT) system, a C-arm system, a positron emission tomography-magnetic resonance imaging (PET-MR) system, a digital subtraction angiography-magnetic resonance imaging (DSA-MRI) system, etc. In some embodiments, the medical system may include a treatment system. The treatment system may include a treatment plan system (TPS), image-guide radiotherapy (IGRT), etc. The image-guide radiotherapy (IGRT) may include a treatment device and an imaging device. The treatment device may include a linear accelerator, a cyclotron, a synchrotron, etc., configured to perform a radio therapy on a subject. The treatment device may include an accelerator of species of particles including, for example, photons, electrons, protons, or heavy ions. The imaging device may include an MRI scanner, a CT scanner (e.g., cone beam computed tomography (CBCT) scanner), a digital radiology (DR) scanner, an electronic portal imaging device (EPID), etc. It should be noted that the medical system described below is merely provided for illustration purposes, and not intended to limit the scope of the present disclosure.

In the present disclosure, the subject may include a biological object and/or a non-biological object. The biological subject may be a human being, an animal, a plant, or a specific portion, organ, and/or tissue thereof. For example, the subject may include a head, a neck, a thorax, a heart, a stomach, a blood vessel, a soft tissue, a tumor, a nodule, or the like, or any combination thereof. In some embodiments, the subject may be a man-made composition of organic and/or inorganic matters that are with or without life. The term "object" or "subject" are used interchangeably in the present disclosure.

In the present disclosure, a representation of an object (e.g., a patient, a subject, or a portion thereof) in an image may be referred to "object" for brevity. For instance, a representation of an organ or tissue (e.g., a heart, a liver, a lung) in an image may be referred to as an organ or tissue for brevity. Further, an image including a representation of an object may be referred to as an image of an object or an image including an object for brevity. Still further, an operation performed on a representation of an object in an image may be referred to as an operation performed on an object for brevity. For instance, a segmentation of a portion of an image including a representation of an organ or tissue from the image may be referred to as a segmentation of an organ or tissue for brevity.

An aspect of the present disclosure relates to systems and methods for image reconstruction. The systems may obtain an initial image (e.g., a CT image) to be processed and generate a reconstructed image by performing a plurality of iteration steps on the initial image. At least one of the plurality of iteration steps may include a first optimization operation and at least one second optimization operation. The first optimization operation and the at least one second optimization operation may be executed sequentially. In the first optimization operation in an iteration step, the systems may receive an image to be processed (e.g., the initial image for the first iteration step) in the iteration step and determine an updated image by preliminarily optimizing the image to be processed. In the at least one second optimization operation in the iteration step, the systems may determine an optimized image by reducing interference information (e.g., noise information, artifact information) of the updated image and designate the optimized image as a next image to be processed in a next iteration step. The systems may determine the optimized image by reducing the interference information of the updated image based on a machine learning model (e.g., a deep learning model).

According to the systems and methods of the present disclosure, a reconstructed image is generated by performing a plurality of iteration steps each of which includes a first optimization operation (which is used to preliminarily optimize the image to be processed) and at least one second optimization operation (which is used to further optimize an updated image generated in the first operation) implemented via a machine learning model, that is, a preliminary optimization and a further optimization via a machine learning model are used in combination, which can improve the image quality of the reconstructed image and reduce the noise of the reconstructed image.

FIG. 1 is a schematic diagram illustrating an exemplary medical system according to some embodiments of the present disclosure. As illustrated, the medical system 100 may include a scanning device 110, a processing device 120, a terminal device 130, a network 140, and a storage device 150. The components of the medical system 100 may be connected in one or more of various ways. Mere by way of example, as illustrated in FIG. 1, the scanning device 110 may be connected to the processing device 120 through the network 140. As another example, the scanning device 110 may be connected to the processing device 120 directly (as indicated by the bi-directional arrow in dotted lines linking the scanning device 110 and the processing device 120). As a further example, the storage device 150 may be connected to the processing device 120 directly or through the network 140. As still a further example, the terminal device 130 may be connected to the processing device 120 directly (as indicated by the bi-directional arrow in dotted lines linking the terminal device 130 and the processing device 120) or through the network 140.

The scanning device 110 may be configured to acquire imaging data relating to at least one part of a subject. The scanning device 110 may scan the subject or a portion thereof that is located within its detection region and generate imaging data relating to the subject or the portion thereof. The imaging data relating to at least one part of a subject may include an image (e.g., an image slice), projection data, or a combination thereof. In some embodiments, the imaging data may be two-dimensional (2D) imaging data, three-dimensional (3D) imaging data, four-dimensional (4D) imaging data, or the like, or any combination thereof. In some embodiments, the scanning device 110 may include a single modality imaging device. For example, the scanning device 110 may include a digital subtraction angiography (DSA), a positron emission tomography (PET) device, a single-photon emission computed tomography (SPECT) device, a magnetic resonance imaging (MRI) device (also referred to as an MR device, an MR scanner), a computed tomography (CT) device, an ultrasonography scanner, a digital radiography (DR) scanner, or the like, or any combination thereof. In some embodiments, the scanning device 110 may include a multi-modality imaging device. Exemplary multi-modality imaging devices may include a PET-CT device, a PET-MR device, or the like, or a combination thereof. For illustration purposes, the present disclosure is described with reference to a CT device.

The processing device 120 may process data and/or information obtained from the scanning device 110, the terminal device 130, and/or the storage device 150. For example, the processing device 120 may obtain an initial image to be processed and generate a reconstructed image by performing a plurality of iteration steps on the initial image. In some embodiments, the processing device 120 may include a central processing unit (CPU), a digital signal processor (DSP), a system on a chip (SoC), a microcontroller unit (MCU), or the like, or any combination thereof. In some embodiments, the processing device 120 may include a computer, a user console, a single server or a server group, etc. The server group may be centralized or distributed. In some embodiments, the processing device 120 may be local or remote. For example, the processing device 120 may access information and/or data stored in the scanning device 110, the terminal device 130, and/or the storage device 150 via the network 140. As another example, the processing device 120 may be directly connected to the scanning device 110, the terminal device 130, and/or the storage device 150 to access stored information and/or data. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 120 or a portion of the processing device 120 may be integrated into the scanning device 110. In some embodiments, the processing device 120 may be implemented by a computing device 200 including one or more components as described in FIG. 2.

The terminal device 130 may include a mobile device 131, a tablet computer 132, a laptop computer 133, or the like, or any combination thereof. In some embodiments, the mobile device 131 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the smart mobile device may include a mobile phone, a personal digital assistant (PDA), a gaming device, a navigation device, a point of sale (POS) device, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal device 130 may be part of the processing device 120.

The network 140 may include any suitable network that can facilitate the exchange of information and/or data for the medical system 100. In some embodiments, one or more components (e.g., the scanning device 110, the processing device 120, the storage device 150, the terminal device 130) of the medical system 100 may communicate information and/or data with one or more other components of the medical system 100 via the network 140. For example, the processing device 120 may obtain data from the scanning device 110 via the network 140. As another example, the terminal device 130 may receive a reconstructed image from the processing device 120 via the network 140. In some embodiments, one or more components (e.g., the scanning device 110, the processing device 120, the storage device 150, the terminal device 130) of the medical system 100 may communicate information and/or data with one or more external resources such as an external database of a third party, etc. For example, the processing device 120 may obtain an optimizing model from a database of a vendor or manufacture (e.g., a manufacture of the scanning device 110) that provides and/or updates the optimizing model. The network 140 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 140 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 140 may include one or more network access points. For example, the network 140 may include wired and/or wireless network access points, such as base stations and/or internet exchange points, through which one or more components of the medical system 100 may be connected to the network 140 to exchange data and/or information.

The storage device 150 may store data, instructions, and/or any other information. In some embodiments, the storage device 150 may store data obtained from the scanning device 110, the terminal device 130, and/or the processing device 120. In some embodiments, the storage device 150 may store data and/or instructions that the processing device 120 may execute or use to perform exemplary methods described in the present disclosure. In some embodiments, the storage device 150 may include a mass storage device, a removable storage device, a volatile read-and-write memory, a read-only memory (ROM), or the like, or a combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), a digital versatile disk ROM, etc. In some embodiments, the storage device 150 may be implemented on a cloud platform as described elsewhere in the disclosure.

In some embodiments, the storage device 150 may be connected to the network 140 to communicate with one or more components (e.g., the scanning device 110, the processing device 120, the terminal device 130) of the medical system 100. One or more components of the medical system 100 may access the data or instructions stored in the storage device 150 via the network 140. In some embodiments, the storage device 150 may be directly connected to or communicate with one or more components of the medical system 100. In some embodiments, the storage device 150 may be part of the processing device 120 or the terminal device 130.

It should be noted that the above description of the medical system 100 is merely provided for the purposes of illustration, and not intended to limit the scope of the present disclosure. For persons having ordinary skills in the art, multiple variations and modifications may be made under the teachings of the present disclosure. For example, the medical system 100 may include one or more additional components and/or one or more components of the medical system 100 described above may be omitted. Additionally or alternatively, two or more components of the medical system 100 may be integrated into a single component. A component of the medical system 100 may be implemented on two or more sub-components.

Figure 2:
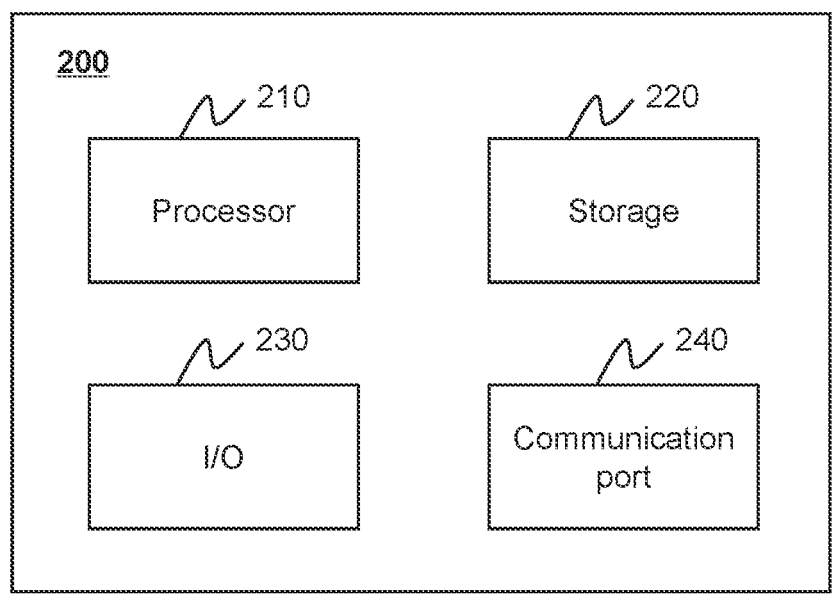
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. The computing device 200 may be used to implement any component of the medical system 100 as described herein. For example, the processing device 120 and/or the terminal device 130 may be implemented on the computing device 200, respectively, via its hardware, software program, firmware, or a combination thereof. Although only one such computing device is shown, for convenience, the computer functions relating to the medical system 100 as described herein may be implemented in a distributed fashion on a number of similar platforms, to distribute the processing load. As illustrated in FIG. 2, the computing device 200 may include a processor 210, a storage 220, an input/output (I/O) 230, and a communication port 240.

The processor 210 may execute computer instructions (e.g., program codes) and perform functions of the processing device 120 in accordance with techniques described herein. The computer instructions may include, for example, routines, programs, objects, components, data structures, procedures, modules, and functions, which perform particular functions described herein. For example, the processor 210 may process scanning data obtained from the scanning device 110, the storage device 150, the terminal device 130, and/or any other components of the medical system 100. As another example, the processor 210 may generate a reconstructed image based on the scanning data.

In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or a combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the scanning device 110, the storage device 150, the terminal device 130, and/or any other component of the medical system 100. In some embodiments, the storage 220 may include a mass storage device, a removable storage device, a volatile read-and-write memory, a read-only memory (ROM), or the like, or a combination thereof. In some embodiments, the storage 220 may store one or more programs and/or instructions to perform exemplary methods described in the present disclosure. For example, the storage 220 may store a program for the processing device 120 to execute to determine an optimizing model. As another example, the storage 220 may store a program for the processing device 120 to execute to apply the optimizing model to determine an optimized image.

The I/O 230 may input and/or output signals, data, information, etc. In some embodiments, the I/O 230 may enable a user interaction with the processing device 120. In some embodiments, the I/O 230 may include an input device and an output device. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to another component (e.g., the processing device 120) via, for example, a bus, for further processing. Other types of the input device may include a cursor control device, such as a mouse, a trackball, or cursor direction keys, etc. The output device may include a display (e.g., a liquid crystal display (LCD), a light-emitting diode (LED)-based display, a flat panel display, a curved screen, a television device, a cathode ray tube (CRT), a touch screen), a speaker, a printer, or the like, or a combination thereof.

The communication port 240 may be connected to a network (e.g., the network 140) to facilitate data communications. The communication port 240 may establish connections between the processing device 120 and one or more components (e.g., the scanning device 110, the storage device 150, and/or the terminal device 130) of the medical system 100. The connection may be a wired connection, a wireless connection, any other communication connection that can enable data transmission and/or reception, and/or a combination of these connections. The wired connection may include, for example, an electrical cable, an optical cable, a telephone wire, or the like, or a combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
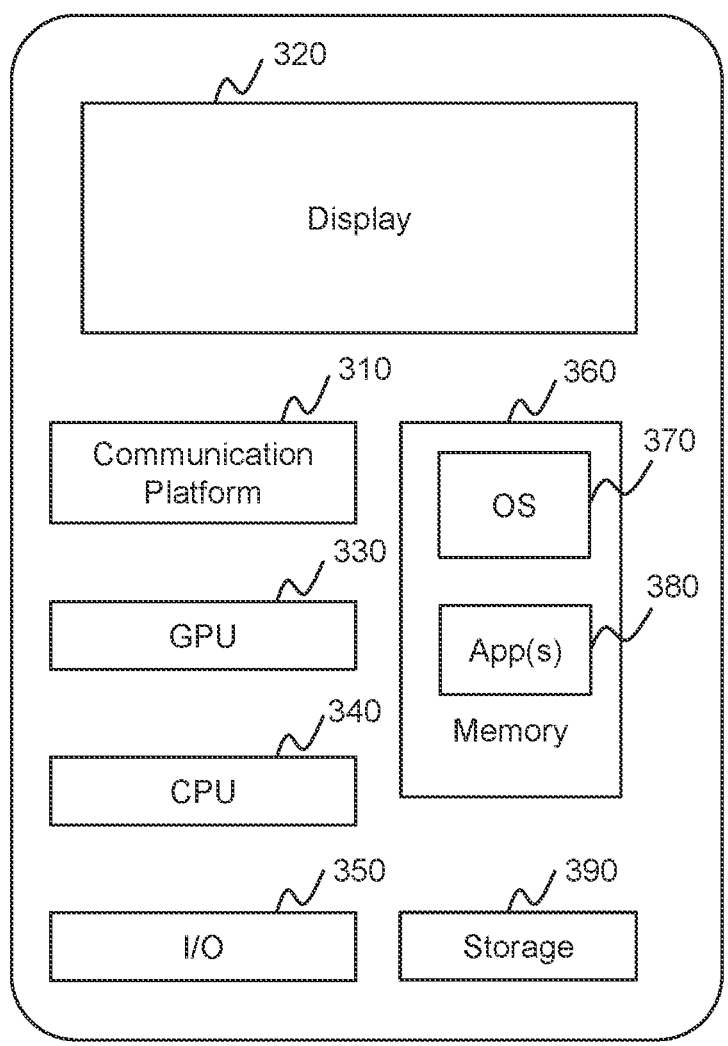
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, one or more components (e.g., the terminal device 130, the processing device 120) of the medical system 100 may be implemented on one or more components of the mobile device 300.

As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to the medical system 100. User interactions with the information stream may be achieved via the I/O 350 and provided to the processing device 120 and/or other components of the medical system 100 via the network 140.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to generate an image as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result, the drawings should be self-explanatory.

Figure 4:
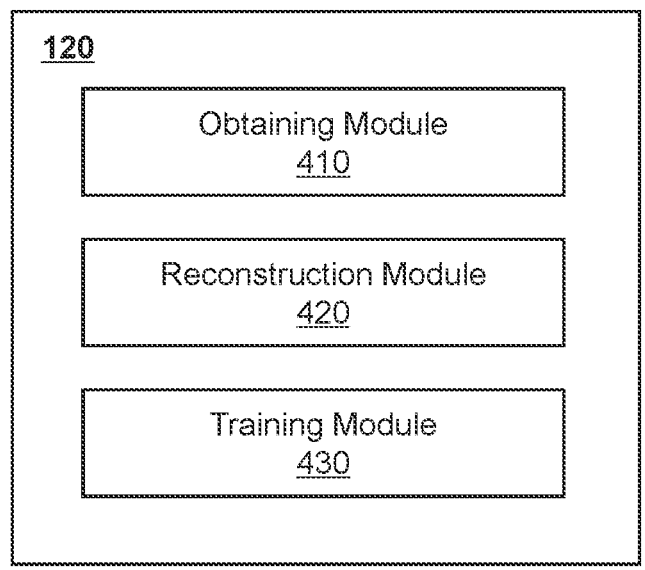
FIG. 4 is a block diagram illustrating an exemplary processing device according to some embodiments of the present disclosure.

FIG. 4 is a block diagram illustrating an exemplary processing device according to some embodiments of the present disclosure. The processing device 120 may be implemented on the computing device 200 (e.g., the processor 210) illustrated in FIG. 2 or the mobile device 300 illustrated in FIG. 3. The processing device 120 may include an obtaining module 410, a reconstruction module 420, and a training module 430.

The obtaining module 410 may be configured to obtain an initial image to be processed. More descriptions regarding the obtaining of the initial image to be processed may be found elsewhere in the present disclosure (e.g., operation 510 and the description thereof).

The reconstruction module 420 may be configured to generate a reconstructed image by performing a plurality of iteration steps on the initial image. In some embodiments, each of the plurality of iteration steps may include a first optimization operation and at least one second optimization operation. In some embodiments, the first optimization operation and the at least one second optimization operation may be executed sequentially. Take a specific iteration step as an example, the first optimization operation may include receiving an image to be processed in the iteration step (e.g., for the first iteration step, the image to be processed is the initial image) and determining an updated image by preliminarily optimizing the image to be processed. The at least one second optimization operation may include determining an optimized image by reducing interference information (e.g., noise information, artifact information) of the updated image and designating the optimized image as a next image to be processed in a next iteration step. In some embodiments, for the at least one second optimization operation, the reconstruction module 420 may determine the optimized image by reducing the interference information based on an optimizing model (e.g., a machine learning model). More descriptions regarding the generating of the reconstructed image may be found elsewhere in the present disclosure (e.g., operation 520, FIG. 6, FIG. 7, and the description thereof).

The training module 430 may be configured to obtain a plurality of training samples and obtain the optimizing model by training a preliminary optimizing model based on the plurality of training samples. More descriptions regarding the obtaining of the optimizing model may be found elsewhere in the present disclosure (e.g., FIG. 8 and the description thereof).

The modules in the processing device 120 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, two or more of the modules may be combined into a single module, and any one of the modules may be divided into two or more units. In some embodiments, the processing device 120 may include one or more additional modules. For example, the reconstruction module 420 and the training module 430 may be combined as a single module which may both generate the reconstructed image and determine the optimizing model. As another example, the reconstruction module 420 may be divided into a first reconstruction unit configured to perform the first optimization operation and a second reconstruction unit configured to perform the at least one second optimization operation. As a further example, the processing device 120 may also include a transmission module (not shown) configured to transmit signals (e.g., electrical signals, electromagnetic signals) to one or more components (e.g., the scanning device 110, the terminal device 130, the storage device 150) of the medical system 100. As a still further example, the processing device 120 may include a storage module (not shown) used to store information and/or data (e.g., the initial image, the updated image, the optimized image) associated with the image reconstruction. As a still further example, the training module 430 may be implemented on a separate device (e.g., a processing device independent from the processing device 120). As a still further example, the training module 430 may be unnecessary and the optimizing model may be obtained from a storage device (e.g., the storage device 150, an external database) disclosed elsewhere in the present disclosure.

Figure 5:
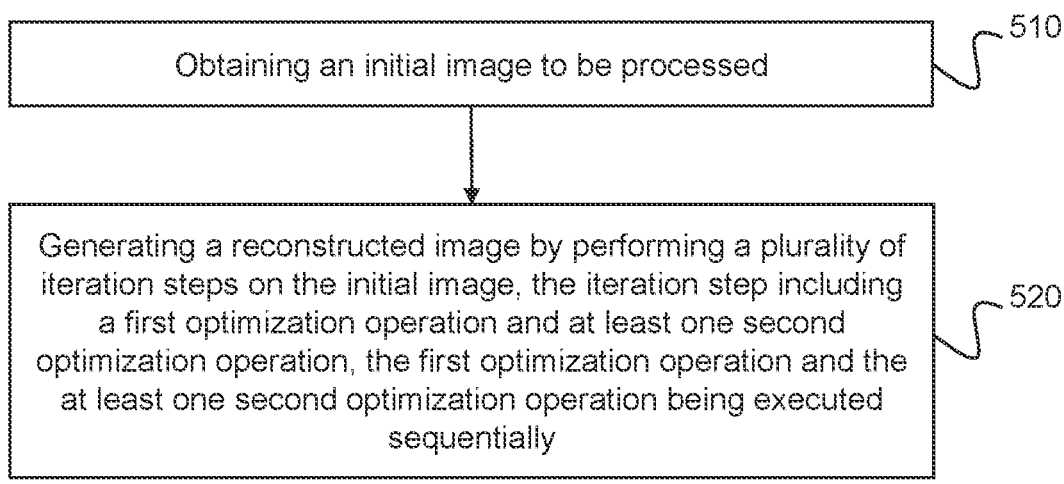
FIG. 5 is a flowchart illustrating an exemplary process for image reconstruction according to some embodiments of the present disclosure.

FIG. 5 is a flowchart illustrating an exemplary process for image reconstruction according to some embodiments of the present disclosure. In some embodiments, process 500 may be executed by the medical system 100. For example, the process 500 may be implemented as a set of instructions (e.g., an application) stored in a storage device (e.g., the storage device 150, the storage 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 510, the processing device 120 (e.g., the obtaining module 410) (e.g., the interface circuits of the processor 210) may obtain an initial image to be processed. As described in connection with FIG. 1, the initial image may include a CT image, an MR image, a PET image, an X-ray image, or the like, or any combination thereof.

In some embodiments, the processing device 120 may direct the scanning device 110 to perform a scan (e.g., a CT scan) on an object (e.g., a patient) and determine the initial image based on scanning data obtained from the scanning device 110. The processing device 120 may determine the initial image based on the scanning data according to a reconstruction algorithm (e.g., a Filter Back Projection (FBP) algorithm). In some embodiments, the initial image may be previously determined and stored in a storage device (e.g., the storage device 150, the storage device 220, and/or the storage 390). The processing device 120 may obtain the initial image from the storage device via a network (e.g., the network 140). In some embodiments, the initial image may be a defined image including pixels with defined pixel values (e.g., 0). The defined pixel values may be default settings of the medical system 100 or may be adjustable under different situations.

In 520, the processing device 120 (e.g., the reconstruction module 420) (e.g., the processing circuits of the processor 210) may generate a reconstructed image by performing a plurality of iteration steps on the initial image.

In some embodiments, each of the plurality of iteration steps may include a first optimization operation and at least one second optimization operation. In some embodiments, the first optimization operation and the at least one second optimization operation may be executed sequentially. Take a specific iteration step as an example, the first optimization operation may include receiving an image to be processed in the iteration step (e.g., for the first iteration step, the image to be processed is the initial image) and determining an updated image by preliminarily optimizing the image to be processed. The at least one second optimization operation may include determining an optimized image by reducing interference information (e.g., noise information, artifact information) of the updated image and designating the optimized image as a next image to be processed in a next iteration step. In some embodiments, for the at least one second optimization operation, the processing device 120 may determine the optimized image by reducing the interference information based on an optimizing model (e.g., a machine learning model). More descriptions of the iteration step may be found elsewhere in the present disclosure (e.g., FIG. 6 and the description thereof).

In some embodiments, also take a specific iteration step as an example, the processing device 120 may determine whether a termination condition is satisfied in the current iteration step. Exemplary termination conditions may include that a certain count of iteration steps has been performed, the optimized image in the current iteration step has reached a desired image quality (e.g., a noise rate is less than a threshold), etc. The certain count may be a default value of the medical system 100, manually set by a user or an operator, or determined by the processing device 120 according to an actual need. In some embodiments, whether the termination condition is satisfied may be determined manually by a user or an operator. For example, the reconstructed image may be displayed on an interface implemented on, for example, the terminal device 130, and the user or the operator may input an evaluation result regarding whether the optimized image has reached desired image quality.

If it is determined that the termination condition is satisfied in the current iteration step, the processing device 120 may designate the optimized image determined in the at least one second optimization operation in the current iteration step as the reconstructed image. If it is determined that the termination condition is not satisfied in the current iteration step, the processing device 120 may proceed to a next iteration step until the termination condition is satisfied.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 500 may be accomplished with one or more additional operations not described and/or without one or more of the operations discussed above. For example, the process 500 may include an additional transmitting operation in which the processing device 120 may transmit the reconstructed image to the terminal device 130. As another example, the process 500 may include an additional storing operation in which the processing device 120 may store information and/or data (e.g., the initial image, the updated image, the optimized image) associated with the image reconstruction in a storage device (e.g., the storage device 150, the storage 220, the storage 390) disclosed elsewhere in the present disclosure.

Figure 6:
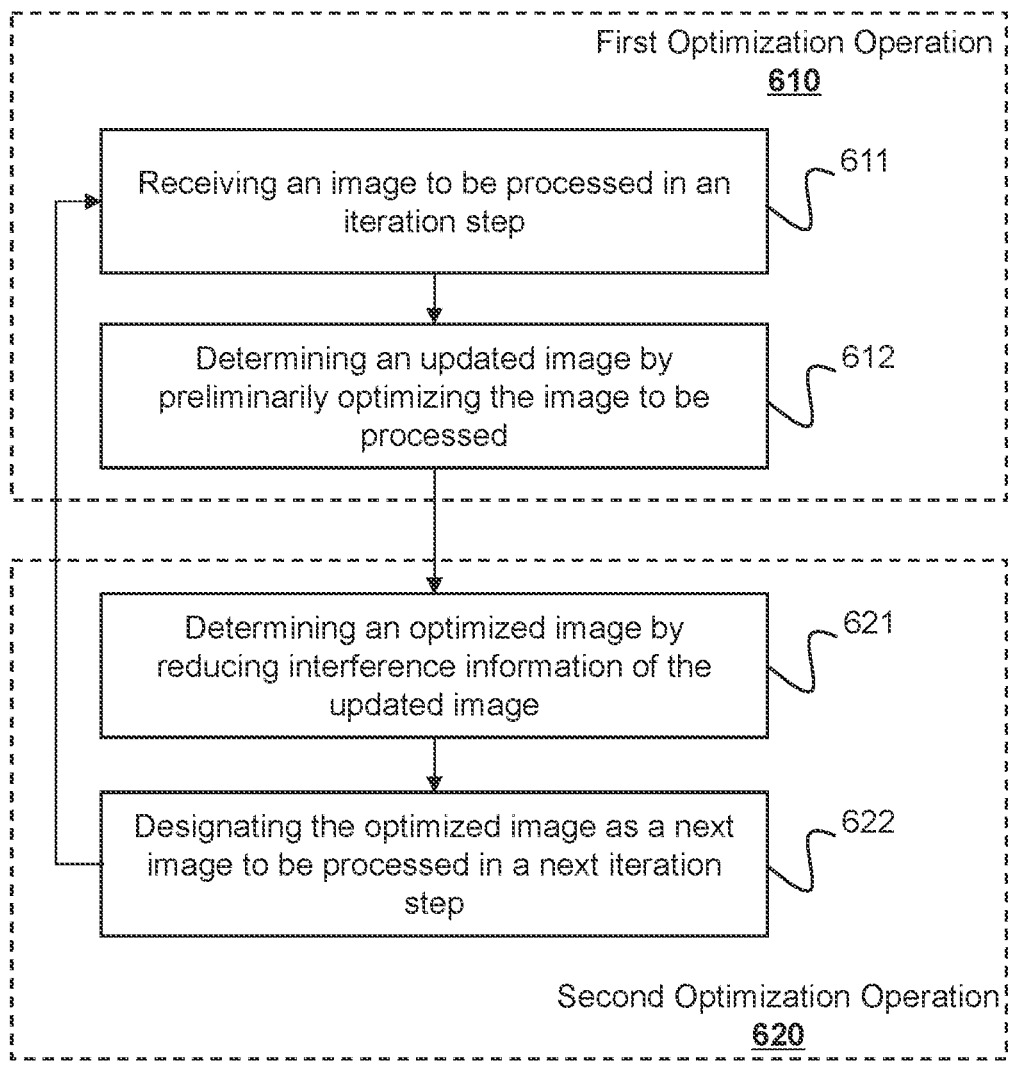
FIG. 6 is a flowchart illustrating an exemplary process for an iteration step according to some embodiments of the present disclosure.

FIG. 6 is a flowchart illustrating an exemplary process for an iteration step according to some embodiments of the present disclosure. In some embodiments, process 600 may be executed by the medical system 100. For example, the process 600 may be implemented as a set of instructions (e.g., an application) stored in a storage device (e.g., the storage device 150, the storage 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 600. The operations of the illustrated process presented below are intended to be illustrative. In some embodiments, the process 600 may be accomplished with one or more additional operations not described and/or without one or more of the operations discussed. Additionally, the order of the operations of process 600 illustrated in FIG. 6 and described below is not intended to be limiting.

As described in connection with FIG. 5, each of the plurality of iteration steps may include a first optimization operation 610 and at least one second optimization operation 620. The first optimization operation 610 may include an operation 611 and an operation 612. The at least one second optimization operation 620 may include an operation 621 and an operation 622.

In 611, the processing device 120 (e.g., the reconstruction module 420) (e.g., the processing circuits of the processor 210) may receive an image to be processed in the iteration step. For example, for the first iteration step, the image to be processed is the initial image; for subsequent iteration steps, the image to be processed is an optimized image determined in a previously adjacent iteration step.

In 612, the processing device 120 (e.g., the reconstruction module 420) (e.g., the processing circuits of the processor 210) may determine an updated image by preliminarily optimizing the image to be processed.

The processing device 120 may determine forward projection data by performing a forward projection transformation on the image to be processed in the iteration step. According to the forward projection transformation, the processing device 120 may transform data (e.g., the image to be processed) in an image domain to data (e.g., the forward projection data) in a projection domain. In some embodiments, the processing device 120 may transform the image to be processed into forward projection data by multiplying the image to be processed by a forward projection matrix. As used herein, the forward projection matrix may be a default setting of the medical system 100 or may be adjustable under different situations.

Further, the processing device 120 may determine the updated image based at least in part on back projection data of a weighted error between the forward projection data and originally acquired projection data associated with the initial image. As used herein, the originally acquired projection data associated with the initial image may refer to original projection data acquired by the scanning device 110, for example, original projection data upon which the initial image is determined. In some embodiments, the processing device 120 may obtain the originally acquired projection data from the scanning device 110 or a storage device (e.g., the storage device 150, the storage device 220, and/or the storage 390) via a network (e.g., the network 140).

In some embodiments, the processing device 120 may determine a first quality weight associated with the originally acquired projection data. For example, the processing device 120 may determine the first quality weight based on interference information (e.g., noise information, artifact information) in the originally acquired projection data. As another example, the processing device 120 may determine the first quality weight based on parameters (e.g., X-ray intensity) for acquiring the originally acquired projection data. The processing device 120 may determine the weighted error between the forward projection data and originally acquired projection data based on the first quality weight, the forward projection data, and the originally acquired projection data. For example, the processing device 120 may determine a difference between the forward projection data and originally acquired projection data as an error between the forward projection data and originally acquired projection data. Further, the processing device 120 may determine the weighted error based on the error and the first quality weight. Alternatively, the processing device 120 may determine a quality feature of the image to be processed in the iteration step and determine a second quality weight based on the quality feature. More descriptions regarding the quality feature may be found elsewhere in the present disclosure (e.g., operation 621 and the description thereof). More descriptions regarding the second quality weight may be found elsewhere in the present disclosure (e.g., FIG. 8 and the description thereof). Further, the processing device 120 may determine the weighted error based on the error and the second quality weight.

The processing device 120 may determine the back projection data of the weighted error by performing a backward projection transformation on the weighted error. According to the back projection transformation, the processing device 120 may transform data (e.g., the weighted error) in a projection domain to data (e.g., the back projection data) in an image domain. For example, the processing device 120 may determine the back projection data of the weighted error by multiplying the weighted error by a back projection matrix. Similarly, the back projection matrix may be a default setting of the medical system 100 or may be adjustable under different situations. The processing device 120 may determine the updated image based on the back projection data of the weighted error.

In some embodiments, the processing device 120 may determine the updated image based at least in part on the back projection data of the weighted error between the forward projection data and originally acquired projection data associated with the initial image according to formula (1) below:

$$U_k = \operatorname*{argmin}_{V_{k-1}} L = \frac{1}{2}(AV_{k-1} - f)^2, \quad (1)$$

where $U_k$ refers to an updated image in a kth iteration step, $V_{k-1}$ refers to an optimized image in a (k−1)th iteration step (i.e., an image to be processed in the kth iteration step), L refers to a loss function, A refers to the forward projection matrix, f refers to the originally acquired projection data associated with the initial image, and $(AV_{k-1}-f)$ refers to the error between the forward projection data and the originally acquired projection data. In some embodiments, the processing device 120 may determine the updated image by solving the formula (1). In some embodiments, the processing device 120 may solve the formula (1) by using Newton's algorithm or a gradient descent algorithm.

Further, the processing device 120 may determine the updated image based on the back projection data of the weighted error. For example, the processing device 120 may solve the formula (1) above by using Newton's algorithm according to formula (2) below:

$$U_k = V_{k-1} - \alpha \frac{A^T(AV_{k-1} - f)_W}{A^T(A\mathbb{1})_W}, \quad (2)$$

where $U_k$ refers to an updated image in a kth iteration step, $V_{k-1}$ refers to an optimized image in a (k−1)th iteration step (i.e., an image to be processed in the kth iteration step), f refers to the originally acquired projection data associated with the initial image, A refers to the forward projection matrix, $A^T$ refers to the back projection matrix, W refers to the first quality weight or the second quality weight, A|| refers to a operation for performing a forward projection transformation on an image with all pixel values of 1, and α refers to an iteration step length of the iteration step, which may be a default setting of the medical system 100 or may be adjustable under different situations.

In 621, the processing device 120 (e.g., the reconstruction module 420) (e.g., the processing circuits of the processor 210) may determine an optimized image by reducing (or eliminating) interference information of the updated image. In other words, after performing the preliminary optimization on the image to be processed in the iteration step, the processing device 120 may perform a further optimization.

In some embodiments, the interference information may include noise information and/or artifact information. The noise information may refer to information related to a noise feature in an image, for example, a noise distribution, a noise intensity, a global noise intensity, a noise rate, etc. The artifact information may refer to information related to an artifact feature in an image, for example, an artifact distribution, an artifact intensity, a global artifact intensity, an artifact rate, etc.

In some embodiments, the processing device 120 may determine the optimized image by reducing interference information of the updated image based on an optimizing model or an optimizing algorithm. In some embodiments, the optimizing algorithm may include a mean filter, an order statistics filter, a smoothing filter, or the like, or any combination thereof. The mean filter may include an arithmetic mean filter, a geometric mean filter, a harmonic mean filter, an inverse harmonic mean filter, or the like, or any combination thereof. The order statistics filter may include a median filter, a two-dimensional (2D) median filter, a modified alpha mean filter, a max/min filter, or the like, or any combination thereof. The smoothing filter may include a local smoothing filter, a super pixel smoothing filter, a spatial low-pass filter, or the like, or any combination thereof.

In some embodiments, the optimizing model may be pre-trained and stored in a storage device (e.g., the storage device 150) disclosed elsewhere in the present disclosure. The processing device 120 may retrieve the optimizing model from the storage device. In some embodiments, the optimizing model may include a machine learning model, for example, a neural network model. The neural network model may include a multi-layer perceptron (MLP) model, a deep neural network (DNN) model, a convolutional neural network (CNN) model, a deep convolutional encoder-decoder (DCED) network model, a generative adversarial network (GAN) model, or the like, or any combination thereof. In some embodiments, the optimizing model may be trained based on a plurality of training samples. More descriptions regarding the optimizing model may be found elsewhere in the present disclosure (e.g., FIG. 8 and the description thereof).

In some embodiments, the processing device 120 may determine a quality feature of the updated image. Further, the processing device 120 may input the updated image and the quality feature into the optimizing model and determine the optimized image based on an output of the optimizing model. The quality feature may include a noise feature, an artifact feature, a gray distribution (e.g., a distribution of pixel gray values of the image), a global gray scale (e.g., an average gray value of the pixel gray values, a weighted average gray value of the pixel gray values), a resolution (e.g., a sharpness degree of the image), a contrast (e.g., a grayscale contrast) of the image to be processed, or the like, or any combination thereof.

As used herein, a noise of an image refers to a random error in the image, which may result in an appearance of mottling, grain, texture, snowflake, etc. in the image. Exemplary noise features may include a noise distribution, a noise intensity, a global noise intensity, a noise rate, or the like, or any combination thereof. In some embodiments, a noise intensity may refer to a value of a noise pixel which reflects an amplitude of the noise in the noise pixel, accordingly, the noise distribution may reflect probability densities of noises with different noise intensities in the image; the global noise intensity may reflect an average noise intensity or a weighted average noise intensity in the image; and the noise rate may reflect a dispersion degree of the noise distribution. In some embodiments, the processing device 120 may determine the noise feature based on a statistical noise model and/or a probability density function (PDF) corresponding to the statistical noise model. For example, the processing device 120 may determine a representation (e.g., a curve, a value, a vector, a matrix) of the noise distribution according to the statistical noise model and/or the PDF. As another example, the processing device 120 may determine the global noise intensity based on an average value or a weighted value associated with the representation of the noise distribution. As a further example, the processing device 120 may determine the noise rate based on a variance and/or a standard deviation of the representation of the noise distribution. As a still further another example, for raw CT data, the processing device 120 may determine a statistic noise model corresponding to the raw CT data by estimating statistical noise characteristics of X-rays used to acquire the raw CT data. Further, the processing device 120a may determine noise feature(s) of the raw CT data based on the statistic noise model and a reconstruction algorithm which may be used to reconstruct the raw CT data. Exemplary statistical noise models may include a Gaussian noise model, an impulse noise model, a Rayleigh noise model, an exponential distribution noise model, a uniform distribution noise model, or the like, or any combination thereof. In some embodiments, the processing device 120 may determine the noise feature of the image using an image block algorithm, a filter algorithm, a spatial sampling algorithm, a Bayesian estimation algorithm, or the like, or any combination thereof.

As used herein, an artifact of an image refers to a portion of an image that does not correspond to any part that actually exists in the subject of the image, which may result in image distortion, image overlap, image loss, image blur, etc. Exemplary artifact features may include an artifact distribution, an artifact intensity, a global artifact intensity, an artifact rate, or the like, or any combination thereof. In some embodiments, an artifact intensity may refer to a value of an artifact pixel which reflects an amplitude of the artifact in the artifact pixel. In some embodiments, the processing device 120 may identify an artifact in the image and determine the artifact intensity based on a feature (e.g., a texture, a shape) of the artifact. In some embodiments, the processing device 120 may determine the feature of the artifact using a feature extraction algorithm. Exemplary extraction algorithms may include a histogram of oriented gradients, a local binary pattern (LBP) algorithm, a scale invariant feature transform (SIFT) algorithm, a Haar-like algorithm, a gray-level co-occurrence matrix (GLCM) algorithm, a Hough transform algorithm, a Fourier transform algorithm, a Fourier shape deors algorithm, a shape factor algorithm, a finite element method (FEM) algorithm, a turning algorithm, a wavelet deor algorithm, etc. Further, similar to the noise feature, the artifact distribution may reflect probability densities of artifacts with different intensities in the image; the global artifact intensity may reflect an average artifact intensity or a weighted average artifact intensity in the image; and the artifact rate may reflect a dispersion degree of the artifact distribution. Similarly, the processing device 120 may also determine the artifact feature based on a statistical model and/or a probability density function (PDF) corresponding to the statistical model.

In some embodiments, the updated image may include different types of interference information (e.g., the noise information, the artifact information). In order to eliminate the different types of interference information as much as possible, the processing device 120 may determine an optimizing model corresponding to each type of interference information. For example, the processing device 120 may determine an artifact optimizing model for reducing or eliminating the artifact information of the updated image. As another example, the processing device 120 may determine a noise optimizing model for reducing or eliminating the noise information of the updated image.

In some embodiments, the processing device 120 may determine an initial feature (e.g., a feature associated with an object included in the updated image, a feature associated with a type of a scanning device upon which the updated image (or the image to be processed) is obtained) of the updated image and select an optimizing model based on the initial feature.

In some embodiments, the processing device 120 may execute a plurality of interference information reduction operations (i.e., operation 621) on the updated image to determine the optimized image. The plurality of interference information reduction operations may be executed based on a plurality of optimizing algorithms or optimizing models. In some embodiments, the plurality of optimizing models may be models of different types. In some embodiments, the plurality of optimizing models may be models of the same type but the same structure or different structures. For example, the plurality of optimizing models may be deep neural network models with different numbers of neural networks or/and different numbers of neurons. As another example, the plurality of optimizing models may be deep neural network models with different activation modes and/or different model structures.

In some embodiments, the processing device 120 may execute the plurality of interference information reduction operations on the updated image sequentially. For example, the processing device 120 may designate a result image obtained in the current interference information reduction operation as a next updated image in a next interference information reduction operation. Further, the processing device 120 may designate a result image obtained in the last interference information reduction operation as the optimized image.

In some embodiments, the processing device 120 may execute the plurality of interference information reduction operations on the updated image in parallel. For example, the processing device 120 may determine a plurality of result images in the plurality of interference information reduction operations. Further, the processing device 120 may determine an average result or a weighted average result of the plurality of result images as the optimized image. In some embodiments, for each of the plurality of result images, the processing device 120 may determine a weight corresponding to the result image based on the optimizing algorithm, model parameters of the optimizing model, a type of the interference information, etc. For example, for a result image obtained based on an optimizing model with relatively more layers, the weight may be relatively high. In some embodiments, the parallel execution of the plurality of interference information reduction operations can reduce a loss of real information in the optimized image.

In 622, the processing device 120 (e.g., the reconstruction module 420) (e.g., the processing circuits of the processor 210) may designate the optimized image as a next image to be processed in a next iteration step.

As described in connection with FIG. 5, the processing device 120 may determine whether a termination condition is satisfied after determining the optimized image. If it is determined that the termination condition is satisfied, the processing device 120 may designate the optimized image as the reconstructed image. If it is determined that the termination condition is not satisfied, the processing device 120 may designate the optimized image as the next image to be processed and execute the first optimization operation 610 in the next iteration step.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 7:
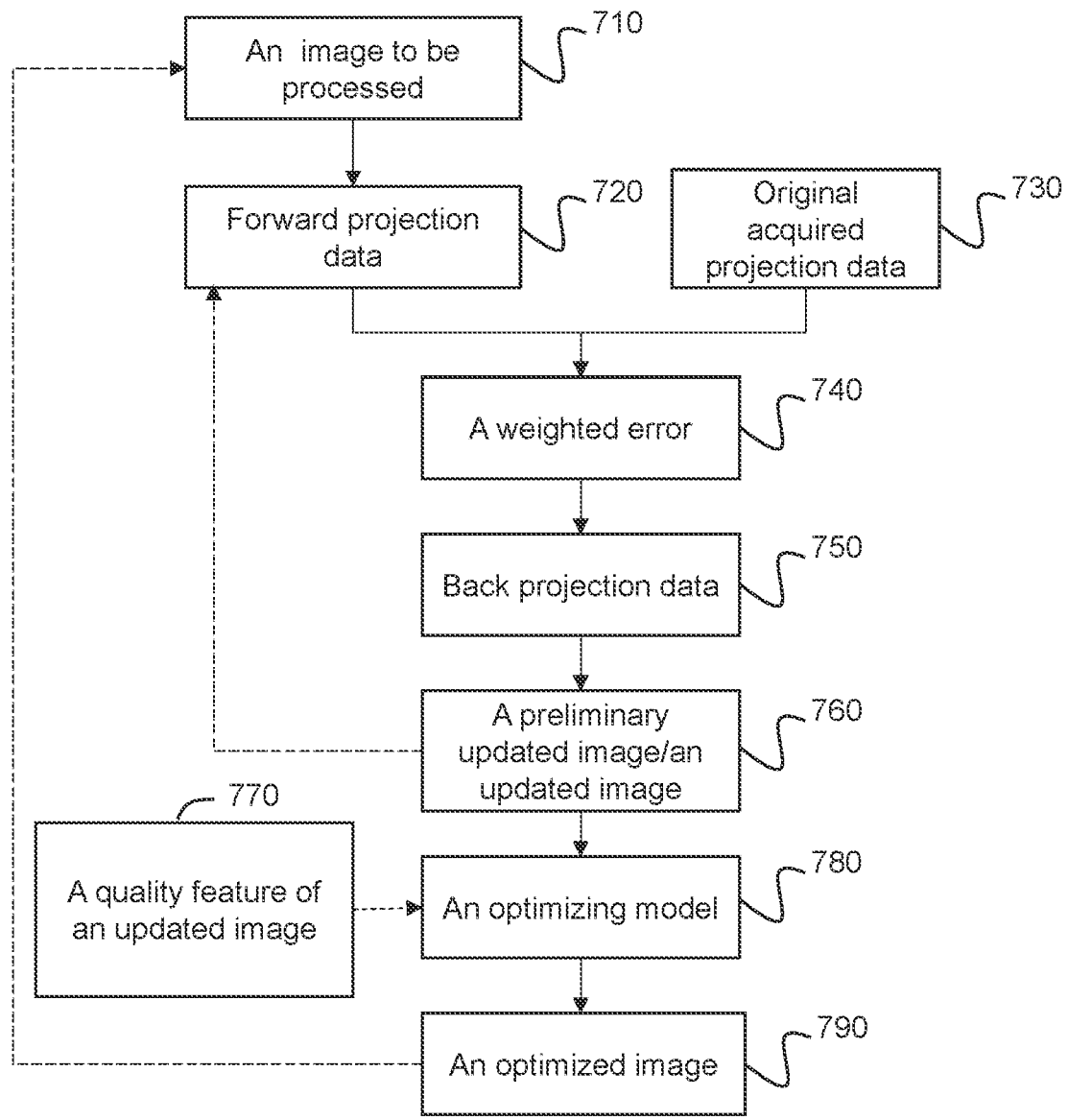
FIG. 7 is a flowchart illustrating an exemplary process for image reconstruction according to some embodiments of the present disclosure.

FIG. 7 is a flowchart illustrating an exemplary process for image reconstruction according to some embodiments of the present disclosure. In some embodiments, process 700 may be executed by the medical system 100. For example, the process 700 may be implemented as a set of instructions (e.g., an application) stored in a storage device (e.g., the storage device 150, the storage 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 700. The operations of the illustrated process presented below are intended to be illustrative. In some embodiments, the process 700 may be accomplished with one or more additional operations not described and/or without one or more of the operations discussed. Additionally, the order of the operations of process 700 illustrated in FIG. 7 and described below is not intended to be limiting.

In 710, the processing device 120 (e.g., the reconstruction module 420) (e.g., the processing circuits of the processor 210) may receive an image to be processed in the current iterative reconstruction. As described in connection with operation 611, for the first iterative reconstruction, the image to be processed is the initial image; for subsequent iterative reconstructions, the image to be processed is an optimized image determined in a previously adjacent iterative reconstruction.

In 720, the processing device 120 (e.g., the reconstruction module 420) (e.g., the processing circuits of the processor 210) may determine forward projection data by performing a forward projection transformation on the image to be processed in the current iteration step.

In 730, the processing device 120 (e.g., the reconstruction module 420) (e.g., the processing circuits of the processor 210) may obtain originally acquired projection data associated with the initial image from the scanning device 110 or a storage device (e.g., the storage device 150, the storage device 220, and/or the storage 390) via a network (e.g., the network 140).

In 740, the processing device 120 (e.g., the reconstruction module 420) (e.g., the processing circuits of the processor 210) may determine a weighted error between the forward projection data and originally acquired projection data associated with the initial image.

In 750, the processing device 120 (e.g., the reconstruction module 420) (e.g., the processing circuits of the processor 210) may determine back projection data by performing a back projection transformation on the weighted error.

In 760, the processing device 120 (e.g., the reconstruction module 420) (e.g., the processing circuits of the processor 210) may determine a preliminary updated image based at least in part on the back projection data. Further, the processing device 120 may determine an updated image by repeating operations 720-760 on the preliminary updated image until the preliminary updated image satisfies a preset condition. In some embodiments, the preset condition may include a certain count of repetitions has been performed, the preliminary updated image has reached a desired image quality (e.g., a noise rate is less than a threshold), etc. The certain count of repetitions may be default settings of the medical system 100 or may be adjustable under different situations.

In 770, the processing device 120 (e.g., the reconstruction module 420) (e.g., the processing circuits of the processor 210) may determine a quality feature of the updated image.

In 780, the processing device 120 (e.g., the reconstruction module 420) (e.g., the processing circuits of the processor 210) may input the updated image and the quality feature into an optimizing model.

In 790, the processing device 120 (e.g., the reconstruction module 420) (e.g., the processing circuits of the processor 210) may determine an optimized image based on an output of the optimizing model. In some embodiments, the processing device 120 may determine whether a termination condition is satisfied in the current iteration step. If it is determined that the termination condition is satisfied in the current iteration step, the processing device 120 may designate the optimized image in the current iteration step as the reconstructed image. If it is determined that the termination condition is not satisfied in the current iteration step, the processing device 120 may designate the optimized image as a next image to be processed in a next iteration step and execute operations 720-790 iteratively until the termination condition is satisfied.

It should be noted that the above description regarding the process 700 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 8:
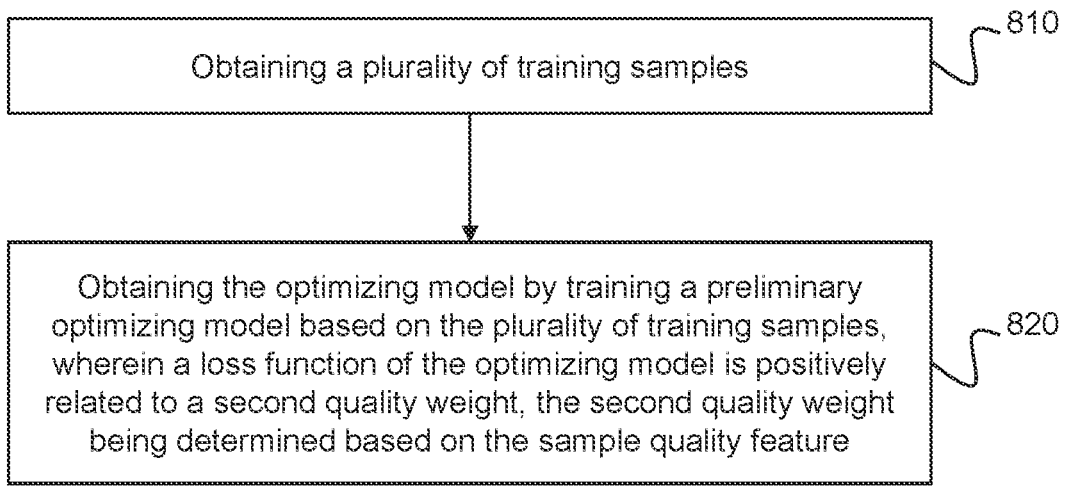
FIG. 8 is a flowchart illustrating an exemplary process for determining an optimizing model according to some embodiment of the present disclosure.

FIG. 8 is a flowchart illustrating an exemplary process for determining an optimizing model according to some embodiment of the present disclosure. In some embodiments, process 800 may be executed by the medical system 100. For example, the process 800 may be implemented as a set of instructions (e.g., an application) stored in a storage device (e.g., the storage device 150, the storage 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 800. Alternatively, the process 800 may be performed by a computing device of a system of a vendor that provides and/or maintains such an optimizing model. The operations of the illustrated process presented below are intended to be illustrative. In some embodiments, the process 800 may be accomplished with one or more additional operations not described and/or without one or more of the operations discussed. Additionally, the order of the operations of process 800 illustrated in FIG. 8 and described below is not intended to be limiting.

In 810, the processing device 120 (e.g., the training module 430) (e.g., the processing circuits of the processor 210) may obtain a plurality of training samples. In some embodiments, at least one of the plurality of training samples may be previously generated and stored in a storage device (e.g., the storage device 150, the storage 220, the storage 390, or an external database). The processing device 120 may retrieve the training samples directly from the storage device.

In some embodiments, each of the plurality of training samples may include a sample image and a sample quality feature of the sample image. As described in connection with operation 621, the sample quality feature may include a sample noise feature, a sample artifact feature, a sample gray distribution, a sample global gray scale, a sample resolution, a sample contrast of the sample image, or the like, or any combination thereof. The sample noise feature may include a sample noise distribution, a sample noise intensity, a sample global noise intensity, a sample noise rate, or the like, or any combination thereof. The sample artifact feature may include a sample artifact distribution, a sample artifact intensity, a sample global artifact intensity, a sample artifact rate, or the like, or any combination thereof.

In some embodiments, the plurality of training samples may correspond to various quality levels (e.g., various noise intensities, various artifact intensities). In some embodiments, the plurality of training samples may be previously generated and stored in a storage device (e.g., the storage device 150, the storage 220, the storage 390, or an external database) disclosed elsewhere in the present disclosure. The processing device 120 may retrieve the plurality of training samples directly from the storage device. In some embodiments, at least a portion of the plurality of training samples may be generated by the processing device 120. Merely by way of example, the processing device 120 may obtain at least one qualified image (e.g., an image with its quality feature satisfying a quality requirement) and generate a plurality of sample images based on the at least one qualified image. For example, the processing device 120 may generate the plurality of sample images by preprocessing (e.g., performing a segmentation, a noise addition, an artifact addition) the at least one qualified image.

Take a specific qualified image as an example, the processing device 120 may segment the qualified image into a plurality of sub-images using an image segmentation algorithm. Exemplary image segmentation algorithms may include a threshold-based segmentation algorithm, an edge-based segmentation algorithm, a region-based segmentation algorithm, a clustering-based algorithm, an image segmentation algorithm based on wavelet transform, an image segmentation algorithm based on mathematical morphology, an image segmentation algorithm based on artificial neural network, or the like, or any combination thereof. As another example, the processing device 120 may add different interference information (e.g., noises and/or artifacts with different levels) into a qualified image or a sub-image to generate a plurality of sample images corresponding to the qualified image or the sub-image. In some embodiments, the processing device 120 may add noises of different types (e.g., a Gaussian noise, an impulse noise, a Rayleigh noise, an exponential distribution noise, a uniform distribution noise, a random noise) with different levels into the qualified image or the sub-image. Similarly, the processing device 120 may add artifacts of different types (e.g., a strip artifact, a ring artifact, a shadow artifact, a ribbon artifact) with different levels into different regions of the qualified image or the sub-image.

In 820, the processing device 120 (e.g., the training module 430) (e.g., the processing circuits of the processor 210) may obtain the optimizing model by training a preliminary optimizing model based on the plurality of training samples. In some embodiments, the preliminary optimizing model may a machine learning model (e.g., a neural network model). As described in connection with FIG. 6, the neural network model may include an MLP model, a DNN model, a CNN model, a DCED network model, a GAN model, or the like, or any combination thereof. In some embodiments, the preliminary optimizing model may include at least one preliminary model parameter. The at least one preliminary model parameter may be a default setting of the medical system 100 or may be adjustable under different situations. Take a CNN model as an example, the at least one preliminary model parameter may include a count of convolutional layers, a count of kernels, a kernel size, a stride, a padding of each convolutional layer, or the like, or any combination thereof.

In some embodiments, the processing device 120 may train the preliminary optimizing model based on one or more gradient descent algorithms. Exemplary gradient descent algorithms may include an Adam optimization algorithm, a stochastic gradient descent (SGD)+Momentum optimization algorithm, a Nesterov accelerated gradient (NAG) algorithm, an Adaptive Gradient (Adagrad) algorithm, an Adaptive Delta (Adadelta) algorithm, a Root Mean Square Propagation (RMSprop) algorithm, an AdaMax algorithm, a Nadam (Nesterov-accelerated Adaptive Moment Estimation) algorithm, an AMSGrad (Adam+SGD) algorithm, or the like, or any combination thereof.

In some embodiments, the processing device 120 may train the preliminary optimizing model iteratively until a termination condition is satisfied. In response to that the termination condition is satisfied, the optimizing model may be finalized. In some embodiments, the termination condition may relate to a value of a loss function. For example, the termination condition may be satisfied if the value of the loss function is minimal or smaller than a predetermined threshold. As another example, the termination condition may be satisfied if the value of the loss function converges. In some embodiments, "convergence" may refer to that the variation of the values of the loss function in two or more consecutive iterations is equal to or smaller than a predetermined threshold. In some embodiments, "convergence" may refer to that a difference between the value of the loss function and a target value is equal to or smaller than a predetermined threshold. In some embodiments, the termination condition may be satisfied when a specified count of iterations have been performed in the training process.

In some embodiments, the loss function may be positively related to a second quality weight which may be associated with a quality level of a sample image and may be determined based on the sample quality feature of the sample image. In some embodiments, the second quality weight may be positively or negatively related to the sample quality feature(s) according to different optimization targets, so as to balance effects of different samples on the training of the model. For example, for a model used for "noise reduction," the plurality of training samples may include samples with relatively high sample noise intensities and samples with relatively low sample noise intensities. During the training, the loss function may be easy to decrease by optimizing the samples with relatively high sample noise intensities. Therefore, in order to balance effects of the samples with relatively high sample noise intensities and the samples with relatively low sample noise intensities on the loss function, second quality weights corresponding to the samples with relatively high sample noise intensities may be less than second quality weights corresponding to the samples with relatively low sample noise intensities. Merely by way of example, the second quality weight may be inversely proportional to the sample noise intensity. From another point of view, the plurality of training samples may include samples with relatively high sample contrasts (e.g., sample CT images including objects with relatively high structure contrasts such as a bone, a lung) and samples with relatively low sample contrasts (e.g., sample CT images including objects with relatively low structure contrasts such as a soft tissue (e.g., a liver)). During the training, the loss function may be easy to decrease by optimizing the samples with relatively high sample contrasts. Therefore, in order to balance effects of the samples with relatively high sample contrasts and the samples with relatively low sample contrasts on the loss function, second quality weights corresponding to the samples with relatively high sample contrasts may be less than second quality weights corresponding to the samples with relatively low sample contrasts. Merely by way of example, the second quality weight may be inversely proportional to the sample contrast.

As another example, similarly, for a model used for "artifact reduction," second quality weights corresponding to samples with relatively high artifact intensities may be less than second quality weights corresponding to samples with relatively low artifact intensities. Merely by way of example, the second quality weight may be inversely proportional to the sample artifact intensity.

As a further example, for a model used for "resolution enhancement," the plurality of training samples may include samples with relatively high sample resolutions and samples with relatively low sample resolutions. During the training, the loss function may be easy to decrease by optimizing the samples with relatively low sample resolutions. Therefore, in order to balance effects of the samples with relatively high sample resolutions and the samples with relatively low sample resolutions on the loss function, second quality weights corresponding to the samples with relatively high sample resolutions may be greater than second quality weights corresponding the samples with relatively low sample resolutions. Merely by way of example, the second quality weight may be proportional to the sample resolution.

In some embodiments, the processing device 120 may determine different optimizing models corresponding to different object types and/or different scanning device types. More descriptions regarding the training of the preliminary optimizing model may be found in, for example, International Application No. PCT/CN2020/090862, entitled "SYSTEMS AND METHODS FOR IMAGE OPTIMIZATION," filed on even date, the contents of which are hereby incorporated by reference.

It should be noted that the above description regarding the process 800 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added or omitted. For example, the processing device 120 may update the optimizing model periodically or irregularly based on one or more newly-generated training samples (e.g., new sample images, new qualified images generated in medical diagnosis). As another example, the processing device 120 may divide the plurality of training samples into a training set and a test set. The training set may be used to train the model and the test set may be used to determine whether the training process has been completed.

Figure 9:
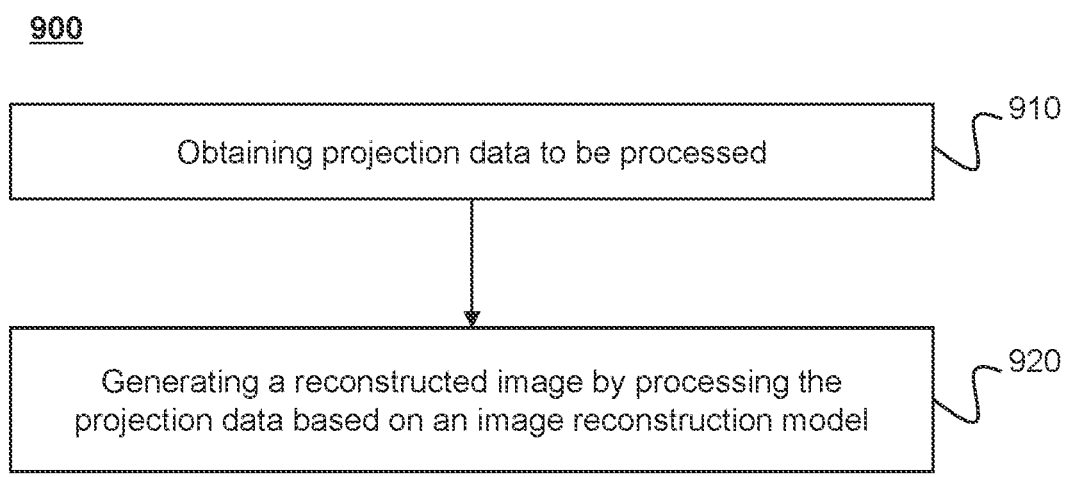
FIG. 9 is a flowchart illustrating an exemplary process for image reconstruction according to some embodiments of the present disclosure.

FIG. 9 is a flowchart illustrating an exemplary process for image reconstruction according to some embodiments of the present disclosure. In some embodiments, process 900 may be executed by the medical system 100. For example, the process 900 may be implemented as a set of instructions (e.g., an application) stored in a storage device (e.g., the storage device 150, the storage 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 900. The operations of the illustrated process presented below are intended to be illustrative. In some embodiments, the process 900 may be accomplished with one or more additional operations not described and/or without one or more of the operations discussed. Additionally, the order of the operations of process 900 illustrated in FIG. 9 and described below is not intended to be limiting.

In 910, the processing device 120 (e.g., the obtaining module 410) (e.g., the interface circuits of the processor 210) may obtain projection data to be processed.

In some embodiments, the projection data to be processed may be originally acquired projection data. In some embodiments, the processing device 120 may direct the scanning device 110 to perform a scan (e.g., a CT scan) on an object (e.g., a patient) to obtain the projection data to be processed. In some embodiments, the projection data to be processed may be previously obtained and stored in a storage device (e.g., the storage device 150, the storage device 220, and/or the storage 390). The processing device 120 may obtain the projection data to be processed from the storage device via a network (e.g., the network 140).

In 920, the processing device 120 (e.g., the reconstruction module 420) (e.g., the processing circuits of the processor 210) may generate a reconstructed image by processing the projection data based on an image reconstruction model.

In some embodiments, the processing device 120 may input the projection data to be processed and/or an initial image) into the image reconstruction model. Further, the processing device 120 may designate an output of the image reconstruction model as the reconstructed image. In some embodiments, the initial image may be an image reconstructed based on the projection data according to a reconstruction algorithm (e.g., an FBP algorithm). In some embodiments, the initial image may be a defined image including pixels with defined pixel values (e.g., 0). The defined pixel values may be default settings of the medical system 100 or may be adjustable under different situations.

In some embodiments, the image reconstruction model may include a plurality of sequentially connected sub-models. Each of the plurality of sequentially connected sub-models may include a processing layer and a reconstruction layer. The processing layer may be configured to receive an image to be processed (for the first sub-model, the image to be processed is the initial image) in the sub-model and determine a regularization result by regularizing the image to be processed based on the projection data. The reconstruction layer may be configured to determine a sub-reconstructed image based on the regularization result and a previous sub-reconstructed image determined by a previously adjacent sub-model and designate the sub-reconstructed image as a next image to be processed in a next sub-model. More descriptions of the image reconstruction model may be found elsewhere in the present disclosure (e.g., FIG. 10 and the description thereof).

It should be noted that the above description regarding the process 900 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added or omitted.

Figure 10:
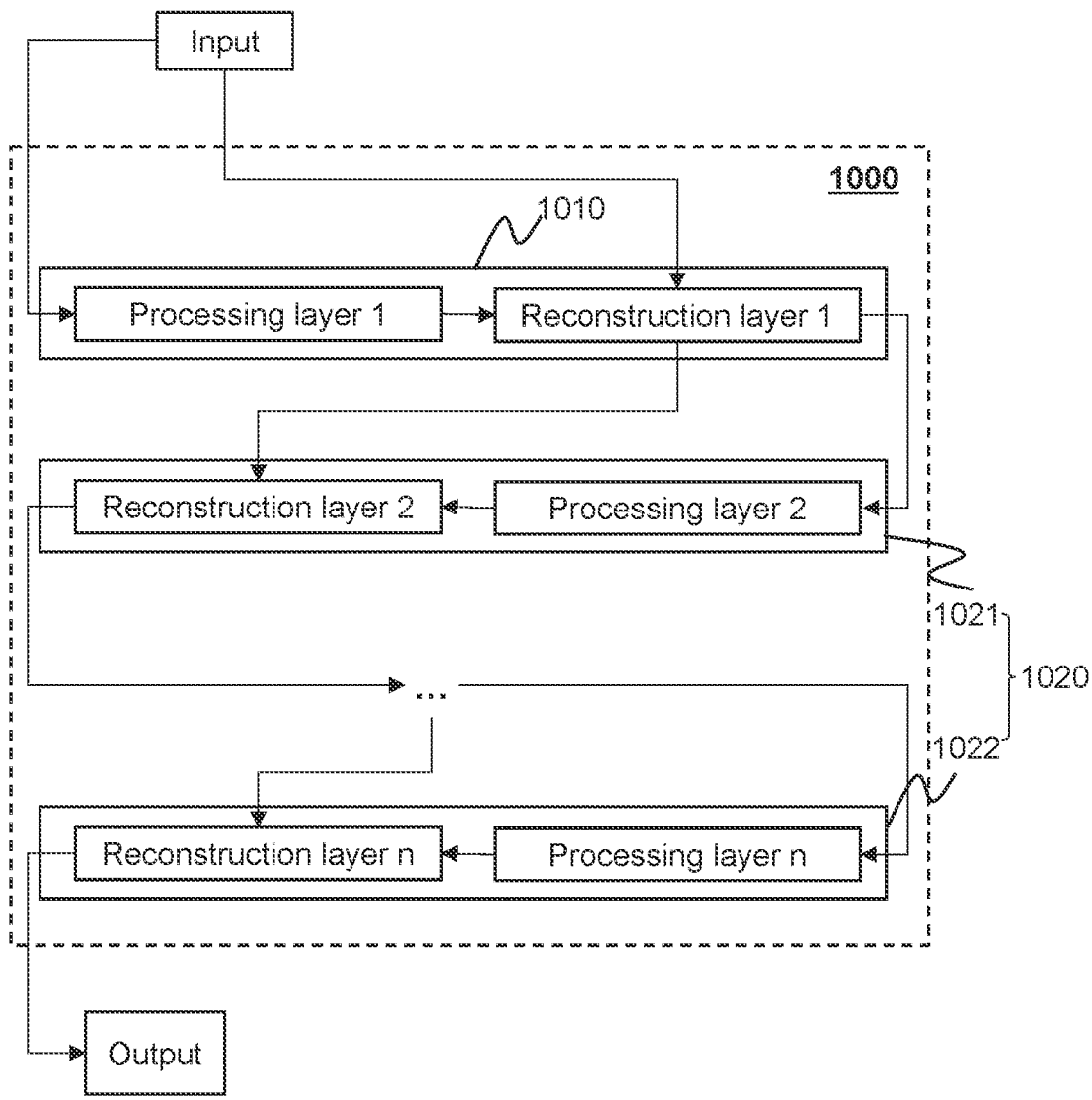
FIG. 10 is a schematic diagram illustrating an exemplary image reconstruction model according to some embodiments of the present disclosure.

FIG. 10 is a schematic diagram illustrating an exemplary image reconstruction model according to some embodiments of the present disclosure. In some embodiments, as described in connection with FIG. 5 and FIG. 6, the processing device 120 may determine a reconstructed image by performing a plurality of iteration steps on an initial image. In some embodiments, the plurality of iteration steps may be implemented via the image reconstruction model 1000. In some embodiments, as described in connection with FIG. 9, the processing device 120 may determine a reconstructed image by processing projection data based the image reconstruction model 1000. As illustrated in FIG. 10, an input of the image reconstruction model 1000 may include originally acquired projection data (i.e., the projection data to be processed illustrated in FIG. 9) and/or an initial image; an output of the image reconstruction model 1000 may include the reconstructed image.

As shown in FIG. 10, the image reconstruction model 1000 may include a plurality of sequentially connected sub-models, such as a first sub-model 1010 and one or more second sub-models 1020 (e.g., 1021 and 1022). In some embodiments, a count of the plurality of sub-models may be a default setting of the medical system 100, manually set by a user or an operator, or determined by the processing device 120 according to an actual need. In some embodiments, the first sub-model 1010 may be configured to receive the input (e.g., the originally acquired projection data and/or the initial image) of the image reconstruction model 1000 and generate an output. Each of the second sub-model 1020 may be configured to receive an output of a previously adjacent sub-model connected to the second sub-model 1020 and generate an output. The output of the image reconstruction model 1000 may be the output of the last second sub-model.

In some embodiments, each of the plurality of sub-models may include a processing layer (e.g., a processing layer 1, a processing layer 2, a processing layer n) and a reconstruction layer (e.g., a reconstruction layer 1, a reconstruction layer 2, a reconstruction layer n).

The processing layer may be configured to receive an image to be processed in the sub-model. In some embodiments, for the first sub-model 1010, the input of the processing layer (e.g., the processing layer 1) may include the input (e.g., the originally acquired projection data and/or the initial image) of the image reconstruction model 1000; for the second sub-model 1020 (e.g., 1021), the input of the processing layer (e.g., the processing layer 2) may include a sub-reconstructed image output by a reconstruction layer (e.g., the reconstruction layer 1) of a previously adjacent sub-model (e.g., the first sub-model 1010). The processing layer may be also configured to determine a regularization result by regularizing the image to be processed based on the projection data. Specifically, the processing layer may be configured to regularize the input of the processing layer and generate a regularization result (e.g., a result matrix) corresponding to the input. For example, the processing layer 1 of the first sub-model 1010 may be configured to regularize the initial image and generate a regularization result of the initial image. As another example, the processing layer 2 of the second sub-model 1021 may be configured to regularize a sub-reconstructed image output by the reconstruction layer 1 and generate a regularization result of the sub-reconstructed image. In some embodiments, the processing layer may include a neural network model. The neural network model may include an MLP model, a DNN model, a CNN model, a DCED network model, a GAN model, or the like, or any combination thereof. In some embodiments, for different sub-models, parameters of the processing layers may be different and may be obtained by training.

The reconstruction layer may be configured to determine a sub-reconstructed image based on the regularization result and a previous sub-reconstructed image determined by a previously adjacent sub-model. In some embodiments, for the first sub-model 1010, the input of the reconstruction layer (e.g., the reconstruction layer 1) may include an output (i.e., the regularization result of the initial image) of the processing layer (e.g., the processing layer 1) of the first sub-model 1010 and the input (e.g., the projection data) of the image reconstruction model 1000; for the second sub-model 1020 (e.g., 1021), the input of the reconstruction layer (e.g., the reconstruction layer 2) may include an output (i.e., the regularization result of the sub-reconstructed image) of a processing layer (e.g., the processing layer 2) of the second sub-model 1020 (e.g., 1021) and a sub-reconstructed image output by a reconstruction layer (e.g., the reconstruction layer 1) in a previously adjacent sub-model (e.g., the first sub-model 1010). The reconstruction layer may be also configured to designate the sub-reconstructed image as a next image to be processed in a next sub-model. As illustrated, the output of the reconstruction layer of each of the plurality of sub-models may include a sub-reconstructed image corresponding to the sub-model. Accordingly, the output of the last reconstruction layer (e.g., the reconstruction layer n) of the last second sub-model (e.g., 1022) may be the reconstructed image.

In some embodiments, the reconstruction layer of each sub-model may be configured to determine a sub-reconstructed image based on the input of the reconstruction layer by using a Newton's algorithm according to formula (3) below:

$$U_m = U_{m-1} - \alpha \frac{A^T(AU_{m-1} - f)_W + \frac{\partial N_m(U_{m-1}, \theta_m)}{\partial U_{k-1}}}{A^T(A\mathbb{1})_W + \frac{\partial^2 N_m(U_{m-1}, \theta_m)}{(\partial U_{m-1})^2}}, \quad (3)$$

where $U_m$ refers to a sub-reconstructed image (also referred to as an mth sub-reconstructed image) output by a reconstruction layer of an mth sub-model, $U_{m-1}$ refers to a sub-reconstructed image (also referred to as a (m−1)th sub-reconstructed image) output by a reconstruction layer of a (m−1)th sub-model, A refers to a forward projection matrix, $A^T$ refers to a back projection matrix, A∥ refers to a operation for performing a forward projection transformation on an image with all pixel values of 1, f refers to the originally acquired projection data, $AU_{m-1}$ refers to forward projection data of the (m−1)th sub-reconstructed image, a refers to an iteration step length, $$\frac{\partial N_m(U_{m-1}, \theta_m)}{\partial U_{k-1}}$$

refers to a regularization result output by a processing layer of the mth sub-model, and W refers to a first quality weight or the second quality weight. More descriptions regarding the quality feature may be found elsewhere in the present disclosure (e.g., operation 610 in FIG. 6 and relevant description thereof).

In some embodiments, parameters of each sub-model in the image reconstruction model 1000 may be obtained by end-to-end training. In some embodiments, the processing device 120 may train the reconstruction model 1000 based on a plurality of training samples with labels. Specifically, the processing device 120 may input the plurality of training samples into a preliminary image reconstruction model and update the parameters of the preliminary image reconstruction model based on the plurality of labeled training samples to obtain the image reconstruction model 1000. In some embodiments, a training sample may include sample projection data and a sample initial image, and a label of the training sample may be a qualified reconstructed image corresponding to the sample initial image. More descriptions regarding model training may be found elsewhere in the present disclosure (e.g., FIG. 8 and the description thereof).

In the above embodiments, a regularization result obtained in a processing layer may be regarded as a regularization term, which is generated based on an image output of a previous layer by the machine learning model. Compared with a fixed regularization term or a regularization term generated by a formula, the above embodiments described in the present disclosure have greater flexibility and adaptability and can achieve a better reconstruction effect (e.g., generate a reconstructed image with improved image quality and reduced noise).

It should be noted that the above description regarding the image reconstruction model 1000 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the image reconstruction model 1000 may include one or more additional components or one or more components described above may be omitted.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction performing system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Per, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for image reconstruction, comprising:
obtaining an initial image to be processed; and
generating a reconstructed image by performing a plurality of iteration steps based on the initial image, wherein for each of the plurality of iteration steps,
  the iteration step includes a first optimization operation and at least one second optimization operation,
  the first optimization operation and the at least one second optimization operation are executed sequentially,
  the first optimization operation includes:
    receiving an image to be processed in the iteration step, wherein the image to be processed in a first iteration step includes the initial image, or the image to be processed includes an output of an optimizing model in a previously adjacent iteration step; and
    determining an updated image by preliminarily optimizing the image to be processed; and
  the at least one second optimization operation includes:
    determining an optimized image by reducing interference information of the updated image based on the optimizing model, the optimizing model including a machine learning model, wherein the interference information includes at least one of noise information or artifact information, wherein the determining the optimized image by reducing the interference information of the updated image includes:
      determining a quality feature of the updated image;
      inputting the updated image and the quality feature into the optimizing model; and
      determining the optimized image based on the output of the optimizing model.

2. The method of claim 1, wherein the determining the updated image by preliminarily optimizing the image to be processed includes:

determining forward projection data by performing a forward projection transformation on the image to be processed in the iteration step; and determining the updated image based at least in part on back projection data of a weighted error between the forward projection data and originally acquired projection data associated with the initial image.

3. The method of claim 2, wherein the determining the updated image based at least in part on the back projection data of the weighted error between the forward projection data and the original acquired projection data includes:

determining a first quality weight associated with the originally acquired projection data;

determining the weighted error between the forward projection data and originally acquired projection data based on the first quality weight, the forward projection data, and the originally acquired projection data;

determining the back projection data of the weighted error by performing a backward projection transformation on the weighted error; and determining the updated image based on the back projection data of the weighted error.

4. The method of claim 1, wherein the first optimization operation is performed according to a Newton's algorithm or a gradient descent algorithm.

5. The method of claim 1, wherein the quality feature includes at least one of a noise feature, an artifact feature, a gray distribution, a global gray scale, a resolution, or a contrast of the updated image.

6. The method of claim 5, wherein the noise feature includes at least one of a noise distribution, a noise intensity, or a noise rate; or the artifact feature includes at least one of an artifact distribution, an artifact intensity, or an artifact rate.

7. The method of claim 1, wherein the optimizing model is obtained by a training process including:

obtaining a plurality of training samples, each of the plurality of training samples including a sample image and a sample quality feature of the sample image; and obtaining the optimizing model by training a preliminary optimizing model based on the plurality of training samples, wherein a loss function of the optimizing model is positively related to a second quality weight, the second quality weight being determined based on the sample quality feature.

8. A system for image reconstruction, comprising:

at least one storage device including a set of instructions; and at least one processor configured to communicate with the at least one storage device, wherein when executing the set of instructions, the at least one processor is configured to direct the system to perform operations including:

obtaining an initial image to be processed; and generating a reconstructed image by performing a plurality of iteration steps based on the initial image, wherein for each of the plurality of iteration steps, the iteration step includes a first optimization operation and at least one second optimization operation, the first optimization operation and the at least one second optimization operation are executed sequentially, the first optimization operation includes:

receiving an image to be processed in the iteration step, wherein the image to be processed in a first iteration step includes the initial image, or the image to be processed includes an output of an optimizing model in a previously adjacent iteration step; and determining an updated image by preliminarily optimizing the image to be processed; and the at least one second optimization operation includes:

determining an optimized image by reducing interference information of the updated image based on the optimizing model, the optimizing model including a machine learning model, wherein the interference information includes at least one of noise information or artifact information, wherein the determining the optimized image by reducing the interference information of the updated image includes:

determining a quality feature of the updated image;

inputting the updated image and the quality feature into the optimizing model; and determining the optimized image based on the output of the optimizing model.

9. The system of claim 8, wherein the determining the updated image by preliminarily optimizing the image to be processed includes:

determining forward projection data by performing a forward projection transformation on the image to be processed in the iteration step; and determining the updated image based at least in part on back projection data of a weighted error between the forward projection data and originally acquired projection data associated with the initial image.

10. The system of claim 9, wherein the determining the updated image based at least in part on the back projection data of the weighted error between the forward projection data and the original acquired projection data includes:

determining a first quality weight associated with the originally acquired projection data;

determining the weighted error between the forward projection data and originally acquired projection data based on the first quality weight, the forward projection data, and the originally acquired projection data;

determining the back projection data of the weighted error by performing a backward projection transformation on the weighted error; and determining the updated image based on the back projection data of the weighted error.

11. The system of claim 8, wherein the first optimization operation is performed according to a Newton's algorithm or a gradient descent algorithm.

12. The system of claim 8, wherein the quality feature includes at least one of a noise feature, an artifact feature, a gray distribution, a global gray scale, a resolution, or a contrast of the updated image.

13. The system of claim 12, wherein the noise feature includes at least one of a noise distribution, a noise intensity, or a noise rate; or the artifact feature includes at least one of an artifact distribution, an artifact intensity, or an artifact rate.

14. The system of claim 8, wherein the optimizing model is obtained by a training process including:

obtaining a plurality of training samples, each of the plurality of training samples including a sample image and a sample quality feature of the sample image; and obtaining the optimizing model by training a preliminary optimizing model based on the plurality of training samples, wherein a loss function of the optimizing model is positively related to a second quality weight, the second quality weight being determined based on the sample quality feature.

15. A system for image reconstruction, comprising:
at least one storage device including a set of instructions; and
at least one processor configured to communicate with the at least one storage device, wherein when executing the set of instructions, the at least one processor is configured to direct the system to perform operations including:
obtaining projection data to be processed; and
generating a reconstructed image by processing the projection data based on an image reconstruction model, wherein the image reconstruction model includes a plurality of sequentially connected sub-models, each of the plurality of sequentially connected sub-models including:
a processing layer configured to:
receive an image to be processed in the sub-model; and
determine a regularization result by regularizing the image to be processed based on the projection data; and
a reconstruction layer configured to:
determine a sub-reconstructed image based on the regularization result and a previous sub-reconstructed image determined by a previously adjacent sub-model; and
designate the sub-reconstructed image as a next image to be processed in a next sub-model, wherein the image reconstruction model is obtained by a training process including:
obtaining a plurality of training samples, each of the plurality of training samples including a sample image and a sample quality feature of the sample image; and
obtaining the image reconstruction model by training a preliminary image reconstruction model based on the plurality of training samples, wherein a loss function of the image reconstruction model is positively related to a second quality weight, the second quality weight being determined based on the sample quality feature.

16. The system of claim 15, wherein
the plurality of training samples includes at least one first sample image and at least one second sample image, a quality level of the at least one first sample image being higher than a quality level of the at least one second sample image, and the quality levels of the at least one first image and the at least one second image being determined based on the sample quality features of the at least one first image and the at least one second image; and
the second quality weight corresponding to the at least one first sample image is different from the second quality weight corresponding to the at least one second sample image.

17. The system of claim 15, wherein the sample quality feature of the sample image includes at least one of a sample noise feature, a sample artifact feature, a sample gray distribution, a sample global gray scale, a sample resolution, or a sample contrast of the sample image.

18. The system of claim 17, wherein
the sample noise feature includes at least one of a sample noise distribution, a sample noise intensity, a sample global noise intensity, or a sample noise rate; and
the sample artifact feature includes at least one of a sample artifact distribution, a sample artifact intensity, a sample global artifact intensity, or a sample artifact rate.

19. The method of claim 1, wherein the quality feature includes at least one of a noise feature or an artifact feature, the noise feature being determined based on a statistical noise model or a probability density function (PDF) corresponding to the statistical noise model, the artifact feature being determined using a feature extraction algorithm.

20. The method of claim 1, wherein the quality feature includes at least one of a noise feature or an artifact feature, wherein
the noise feature includes at least one of a noise distribution, a noise intensity, or a noise rate, a representation of the noise distribution being determined according to a statistical noise model or a probability density function (PDF) corresponding to the statistical noise model, the noise intensity and the noise rate being determined based on the representation of the noise distribution, and
the artifact feature includes at least one of an artifact distribution, an artifact intensity, or an artifact rate, a representation of the artifact distribution being determined according to a statistical artifact model or a probability density function (PDF) corresponding to the statistical artifact model, the artifact intensity and the artifact rate being determined based on the representation of the artifact distribution.

* * * * *